United States Patent [19]

Fukushima et al.

[11] Patent Number: 6,014,460
[45] Date of Patent: *Jan. 11, 2000

[54] CHARACTER STRINGS READING DEVICE

[75] Inventors: Toshikazu Fukushima; Eiki Ishidera; Masahiko Hamanaka; Daisuke Nishiwaki, all of Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/575,027

[22] Filed: Dec. 19, 1995

[30] Foreign Application Priority Data

Dec. 20, 1994 [JP] Japan .................................. 6-317163

[51] Int. Cl.⁷ ............................... G06K 9/34; G06K 9/72
[52] U.S. Cl. ......................... 382/177; 382/185; 382/229
[58] Field of Search ..................................... 382/229, 187, 382/188, 137, 189, 309, 217, 225, 226, 227, 177, 178, 179, 310, 230, 231; 395/795, 2.6–2.65

[56] References Cited

U.S. PATENT DOCUMENTS

| | | | |
|---|---|---|---|
| 4,903,206 | 2/1990 | Itoh et al. | 707/533 |
| 4,979,227 | 12/1990 | Mittelbach et al. | 382/231 |
| 5,050,218 | 9/1991 | Ikeda et al. | 382/177 |
| 5,146,512 | 9/1992 | Weideman et al. | 382/218 |
| 5,148,367 | 9/1992 | Saito et al. | 707/533 |
| 5,557,789 | 9/1996 | Mase et al. | 382/187 |
| 5,724,457 | 3/1998 | Fukushima | 382/187 |
| 5,768,451 | 6/1998 | Hisamitsu et al. | 382/309 |
| 5,787,197 | 7/1998 | Beigi et al. | 382/187 |
| 5,854,855 | 12/1998 | Errico et al. | 382/187 |

FOREIGN PATENT DOCUMENTS

| | | |
|---|---|---|
| 0 312 905 | 12/1988 | European Pat. Off. . |
| 0 553 745 | 8/1993 | European Pat. Off. . |
| 61-86883 | 5/1986 | Japan . |
| 62-251986 | 11/1987 | Japan . |
| 2-300972 | 12/1990 | Japan . |
| 3-73086 | 3/1991 | Japan . |
| 3-189780 | 8/1991 | Japan . |
| 5-46814 | 2/1993 | Japan . |
| 5-324899 | 12/1993 | Japan . |

OTHER PUBLICATIONS

Ishikawa et al., "OCR Address Reading/Letter Sorting Machine for the Ministry of Posts and Telecommunications of Japan", NEC Technical Journal, vol. 44, No. 2, 1990.

Nishino et al., "Natural Language Processing in Text Recognition", Journal of Information Processing Society of Japan, vol. 34, No. 10, 1993.

Itoh et al., "A Method of Detecting and Correcting Errors in the Japanese OCR", Transactions of Information Processing Society of Japan, vol. 33, No. 5, 1992.

Takao et al., "Implementation and Evaluation of Post–processing for Japanese Document Reader", Transactions of Information Processing Society of Japan, vol. 30, No. 11, 1989.

Torimoto et al., "Japanese Address Reader–Sorter, Model TR–17", Toshiba Review, vol. 45, No. 2, 1990.

Nakabayashi et al., "An Input Method for Handwritten Character Strings Using Ambiguous Word Matching", NTT Electrical Communications Laboratories pp. 435–438.

*Primary Examiner*—Jon Chang
*Attorney, Agent, or Firm*—Foley & Lardner

[57] ABSTRACT

A character strings reading device for reading character strings from input image data comprises cut-out recognition means for cutting out a segment corresponding to one character from the image data to perform individual character recognition every segment, a recognition result buffer for storing a recognition result of the cut-out recognition means, word searching means for searching a word string candidate corresponding to a combination of character candidates in the recognition result buffer, a word string candidate buffer for storing a search result of the word searching means, check portion determining means for determining a check target portion and a presumed character string of the check target portion on the basis of the result in the word string candidate buffer, and check means for judging the possibility of existence of the presumed character string on the check portion.

4 Claims, 15 Drawing Sheets

FIG.1B
(PRIOR ART)

| | | | | | |
|---|---|---|---|---|---|
| 西 | \<nishi\> | 東 | \<to\> | 京 | \<kyo\> |
| 品 | \<shina\> | 五 | \<go\> | 本 | \<hon\> |
| 台 | \<dai\> | 反 | \<tan\> | 都 | \<miyako\> |
| 川 | \<kawa\> | 田 | \<ta\> | 荏 | \<e\> |
| 区 | \<ku\> | 豊 | \<yutaka\> | 原 | \<hara\> |
| 中 | \<naka\> | 町 | \<machi\> | 旗 | \<hata\> |
| 延 | \<nobu\> | 広 | \<hiro\> | の | \<no\> |
| 小 | \<ko\> | 葉 | \<ha\> | 平 | \<hira\> |
| 八 | \<hachi\> | 島 | \<shima\> | 塚 | \<tsuka\> |
| 山 | \<yama\> | 潮 | \<shio\> | 大 | \<oh\> |
| 南 | \<minami\> | 三 | \<san\> | 北 | \<kita\> |

F I G.13
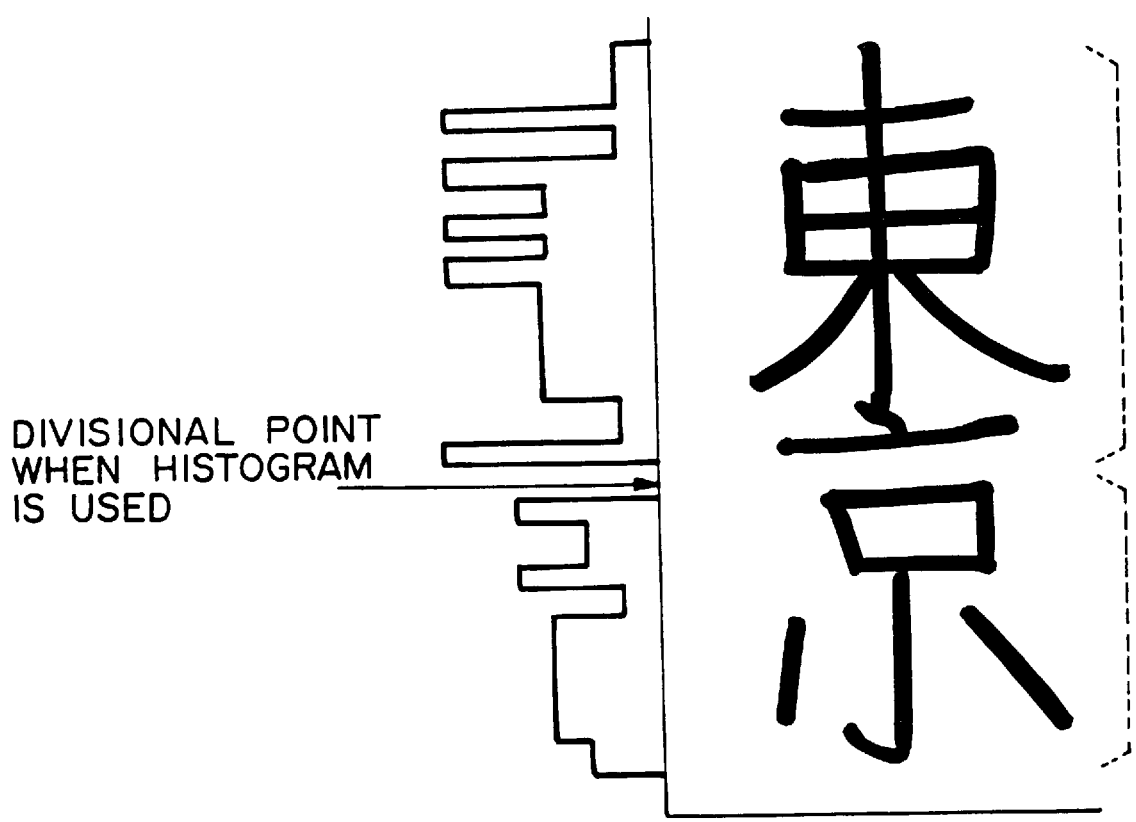

| CANDIDATE | FORMAT | CONTACT PORTION |
|---|---|---|
| 東京 | VERTICAL WRITING | CENTER |
| 東京 | LATERAL WRITING | LOWER END |
| 中央 | VERTICAL WRITING | CENTER |
| 町田 | VERTICAL WRITING | RIGHT END |
| 町田 | LATERAL WRITING | CENTER |
| 市* | VERTICAL WRITING | CENTER |
| ... | ... | ... |

( * represents indeterminate )

CHARACTER STRINGS READING DEVICE

BACKGROUND OF THE INVENTION

1. Field of the Invention

The present invention relates to a character strings reading device for reading character strings from input image data, and more particularly to a device for reading addresses written on mails or a register, a device for reading sentences in a document, a pen input device for writing sentences into a computer with a stylus pen or the like.

2. Description of Related Art

In a conventional character strings reading device, image data are first input and then a segment corresponding to each character is cut out from the image data. Subsequently, character recognition is individually performed on each segment. In some cases, a reading result of a character string is determined until this stage. However, in order to make the reading result more accurate, restriction on an alignment (string) of words is applied to the characters of the segments. In this case, a character candidate string as an individual recognition result is collated with a word dictionary to obtain a proper character string as a word alignment.

The reading of addresses along the above processing flow will be described with reference to FIG. 1A.

In order to read an address, image data on an address area of a mail or a register are input. In this case, "words" mean address elements such as the names of To, Do, Fu and Ken (the metropolis and districts, e.g., the names of states) and the names of cities, wards, districts, towns, villages, etc.

In FIG. 1A, a segment 20 corresponding to each character is first cut out from the image data 10, and then character recognition is performed on each cut-out segment 20 to thereby obtain various character candidate strings 30. These character candidate strings 30 correspond to arrays of character candidates which are selected as characters similar to correct characters of the image data 10. At this stage, plural character candidates are selected for one segment. For example, three character candidates <nishi>, <shina>, <dai> are selected as a character candidate which corresponds to or similar to a segment 20 at the leftmost side. In this specification, a word consisting of a single character or an array of characters, which is represented by "romaji" (a method of writing Japanese in Roman characters) between numerals <and>, such as <nishi>, <shina>, <dai>, etc. means one character corresponding to Japanese Kanji as illustrated in the drawings.

The relation between the Kanji characters used in the drawings and the "romaji" representations thereof is shown in FIG. 1B. It should be noted, however, that each Japanese or Chinese characters has usually two or more different pronunciations according to the combination with another character or its meaning, the representations shown in FIG. 1A are not necessarily correct in the general idiomatic sense of Japanese language.

By collating the character candidate strings 30 with a dictionary for address elements, a combination of address elements (<shina><kawa><ku>)(<naka><nobu>) is selected as a best combination, and this combination is finally selected as an address reading result 90.

This type of conventional address reading device is described in "OCR Address Reading/Letter Sorting Machine for the Ministry of Posts and Telecommunications of Japan" (by Ishikawa, et.al., NEC Technical Journal, Vol. 44, No. 3, 1991), "Japanese Address Reader-Sorter, Model TR-17" (by Torimoto, et.al., Toshiba Review, Vol. 45, No. 2, 1990), Japanese Laid-open Patent Application No. Hei-5-324899 for "Recognition Device for Addresses written on Mails", Japanese Laid-open Patent Application No. Hei-3-189780 for "Address Recognition Device".

Furthermore, conventional devices for reading sentences in a document and conventional devices for inputting sentences with a pen are described in "Implementation and Evaluation of Post-processing for Japanese Document Readers by (Takao, et. all, Transactions of Information Processing Society of Japan, Vol. 30, No. 11, 1989), "A Method of Detecting and Correcting Errors in the Japanese OCR" (by Ito, et.al., Transactions of Information Processing Society of Japan, Vol. 33, No. 5, 1992), "Natural Language Processing in Text Recognition" (by Nishino, Journal of Information Processing Society of Japan, Vol.34, No. 10, 1993), "On-line Handwritten character recognition system" of Japanese Laid-open Patent Application No. Sho-61-086883.

All characters constituting a correct character string are not necessarily contained in character candidates as an individual character recognition result. In the case of FIG. 1A, a correct character string corresponds to a combination of character candidates contained in character candidate strings 30. However, for example, if <kawa> does not exist at a second segment from the left side of the character candidate strings 30 and character candidate strings 30 shown in FIG. 2A are selected, the correct character string <shina><kawa><ku><naka><nobu> cannot be obtained by any combination of the character candidates of the character candidate strings 30.

According to a first method of finally determining the reading result in such a status, vermicular (read skip) collation (imperfect coincidence) is permitted to the character recognition. For the character candidate strings 30 of FIG. 2A, there is a possibility that <shina><kawa><ku><naka><nobu> or <shina><kawa><ku><nishi><naka><nobu> is selected as a candidate 91 of the address reading result (when <shina><kawa><ku><nishi><naka><nobu> is selected, the selection is made in consideration of an judgment that one segment covers two characters due to ambiguity of the cut-out of characters.

According to a second method, the number of character candidates is beforehand increased to reduce the possibility of omission of a correct character, and these character candidates are collated with a word dictionary. In Japanese Laid-open Patent Application No. Sho-62-251986 for "Erroneously-read Character Correcting Processing Device", it is described that another character which is similar to each character candidate is added after the character recognition and then these characters are also collated with a word dictionary. If this method is applied to the case of FIG. 2A, <kawa> is added to the character candidates as a similar character to <ko>.

According to a third method, a character coincidence condition for the collation is expanded when the collation with the word dictionary fails. For example, in Japanese Laid-open Patent Application No. Hei-3-73086 for "Character Recognition Post-processing system", it is described that character coincidence is judged as the number of strokes in a Chinese character is nearer. In the case of FIG. 2A, since the number of the strokes of <ko> or a group of {<ko>, <hachi>, <yama>} is near to that of <kawa>, it is regarded as being coincident with <kawa>.

According to a fourth method, a character candidate is replaced by another character when the collation of the character candidate with the word dictionary fails, and then the new character candidate is collated with the word dictionary again. In Japanese Laid-open Patent Application No. Sho-58-4490 for "Character Recognition Device", a first candidate character string is first collated with the word dictionary. When the collation fails, it is replaced by a second candidate or subsequent candidates, and then a character string having a new candidate is collated with the word dictionary. Furthermore, in Japanese Laid-open Patent Application No. Hei-5-46814 for "Character Reading Device", a character candidate is replaced by another character having an outline which is similar to the outline of the character candidate, and then it is collated with the word dictionary again.

According to a fifth method, a collating condition or the like is altered and the processing from the character recognition step is re-tried. In Japanese Laid-open Patent Application No. Hei-2-300972 for "Electronic dictionary", a slice level at which multi-value image data are digitalized is altered and then the character recognition is tried again.

Considering that the character recognition is also applied to various character strings containing handwritten character strings, there is a low possibility that all characters constituting a correct character string are obtained as character candidates of the cut-out recognition result by the present character cut-out and character recognition performance. Accordingly, it is extremely rare that the correct character string is read out by a character strings reading device which is based on the assumption that all the characters constituting the correct character string are contained in the character candidates.

Therefore, there must be indispensably provided a method of enabling an accurate reading even when correct characters are omitted from a correct character string. The above five methods have been proposed to satisfy this requirement, however, the methods (first to fifth methods) as described above have the following disadvantages.

The first method is a basic method, but, involves a disadvantage that a large number of character candidates are necessarily selected as reading results (i.e., a large number of possibilities (candidates) exist), and thus information quantity is too insufficient to determine an accurate reading result by screening a large number of candidates (narrowing the possibility).

In the second method, the number of possibilities or candidates is beforehand increased, so that there occur many cases where a large number of possibilities (candidates) are selected as final reading results. Furthermore, as the number of character candidates is increased, a data amount to be processed and a processing time are generally increased in accordance with combinations thereof.

In the third method, a large number of candidates are screened, however, there are provided a large number of reading results which are close to each other in the number of strokes of chinese character, so that an actual effect is insufficient. In the fourth and fifth methods, the processing efficiency is low because the collation with the word dictionary is repeated every time a character candidate is varied.

Furthermore, even when a correct character is contained in a character candidate string, there are some cases where a reading result based on another character candidate exists, i.e., the character recognition has no vermiculation, and it competes against the correct character. FIG. 2B shows this case. In FIG. 2B, both <nishi> and <minami> exist as a character candidate at a fourth segment from the left side, and thus each of (<shina><kawa><ku><nishi><shina><kawa>) and (<shina><kawa><ku><minami><shina><kawa>) are selected as a combination of character candidates which is subjected to no read-skip (no vermiculation). The conventional first to fifth methods as described above are proposed on the assumption that the character reading is not well performed or a read skip occurs, and thus these methods are not applicable to precisely select a character candidate in a case where plural character candidates (reading results) are obtained with no read skip. In such a case that plural candidates complete against one another, these conventional methods utilize reliability of a character candidate as an assist factor at the best.

For example, in the case of FIG. 2B, if <nishi> has higher reliability as a character candidate (i.e., higher candidate order) than <minami>, <shina><kawa><ku><nishi><shina><kawa> is preferentially determined as a final reading result. However, if a character candidate is coercively determined in such a condition that sufficient information is not obtained when plural character candidates complete against one another, a reading error would occur.

SUMMARY OF THE INVENTION

An object of the present invention is to provide a character strings reading device which is capable of performing an accurate character reading operation with high efficiency even when correct characters are not necessarily contained in a character cut-out/character recognition result, and also is capable of performing an accurate judgment when a correct character competes against another character candidate, thereby performing an accurate character reading operation.

In order to attain the above object, a character strings reading device for reading character strings from input image data comprises cut-out recognition means for cutting out a segment corresponding to one character from the image data to perform individual character recognition every segment, a recognition result buffer for storing a recognition result of the cut-out recognition means, word searching means for searching a word string candidate corresponding to a combination of character candidates in the recognition result buffer, a word string candidate buffer for storing a search result of the word searching means, check portion determining means for determining a check target portion and a presumed character string of the check target portion on the basis of the result in the word string candidate buffer, and check means for judging the possibility of existence of the presumed character string on the check portion.

According to the present invention, the possibility of existence of a presumed character string is inspected when a correct character is not contained in a character candidate string and thus the read skip is performed, or when plural reading results (character candidates) occur due to existence of a character candidate which competes against a correct character.

In the case of FIG. 2A, with respect to the candidate 91 as an address reading result of <shina><kawa><ku><naka><nobu>, <kawa> which is skipped because it is not contained in character candidates is inspected as a presumed character string. Furthermore, with respect to the candidate 91 as an address reading result of <shina><kawa><ku><nish><naka><nobu>, <kawa><ku> is inspected as a presumed character string.

In the case of FIG. 2B, with respect to the two candidates 91 as an address reading result of <shina><kawa><ku><nishi><shina><kawa> and <shina><kawa><ku>

<minami><shina><kawa>, <nishi> and <minami> which complete against each other are inspected a presumed character strings. Through the check, information for an judgment on a portion to be inspected is increased, and the reading operation can be more accurately performed by utilizing the increase of the information. In addition, all targets to be read out are not re-tried, but it is sufficient only to screen check target portions and judge the possibility of existence of a presumed character string, so that the processing can be more efficiently performed as compared with the conventional method.

BRIEF DESCRIPTION OF THE DRAWINGS

FIG. 1B shows a relation between Japanese or Chinese characters and "romaji" representation;

FIG. 11 shows an example of the content of a tag dictionary memory;

FIG. 13 shows an example of a pattern of a check target portion;

DETAILED DESCRIPTION OF THE PREFERRED EMBODIMENTS

Referring now to the preferred embodiments of the present invention with reference to the accompanying drawings.

Figure 3:
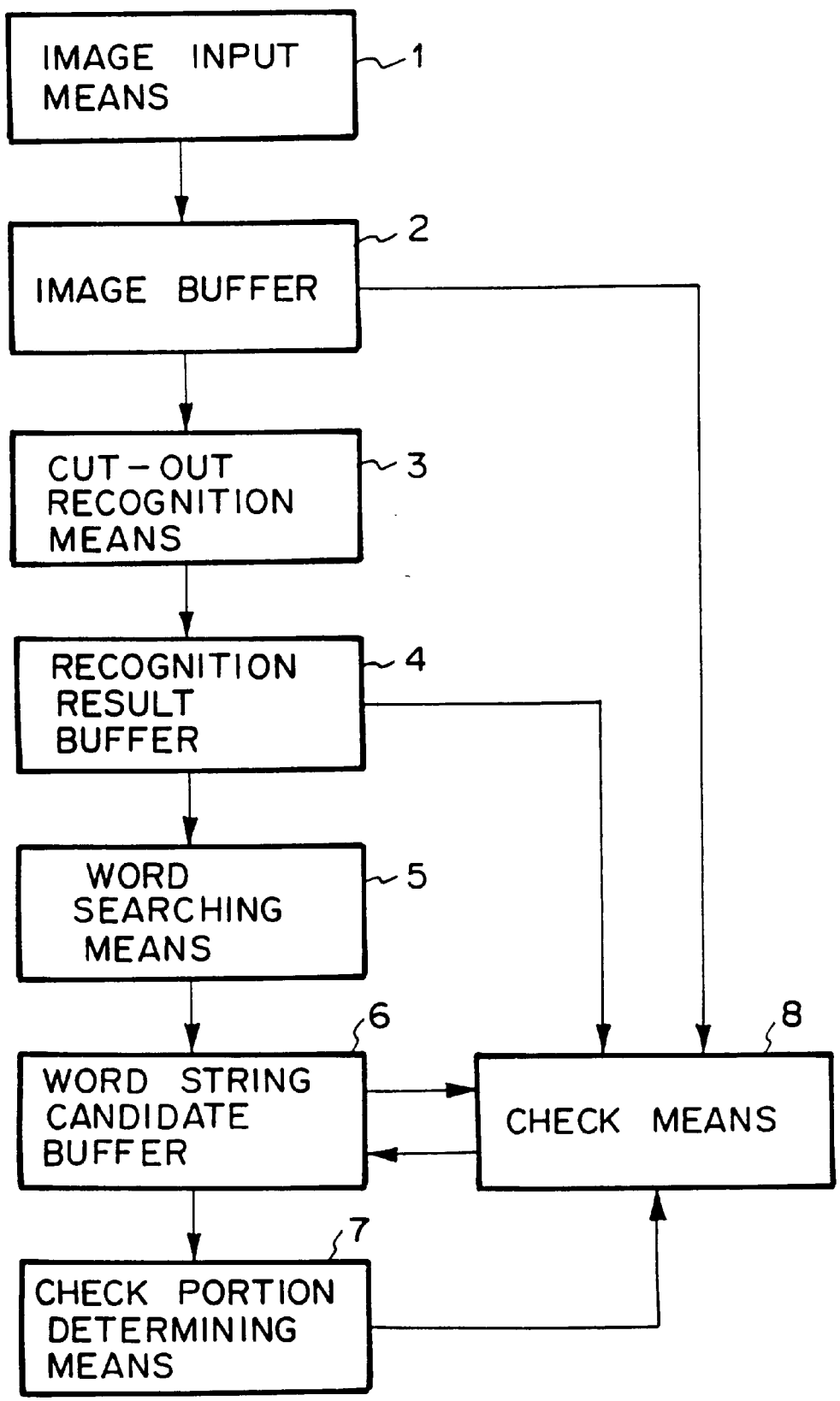
FIG. 3 is a block diagram showing the construction of a character strings reading device embodying the present invention.

FIG. 3 is a block diagram showing the character strings reading device embodying the present invention.

In FIG. 3, the character strings reading device of this invention includes image input means 1 for inputting image data, an image buffer 2 for storing image data which are input through the image input means 1, cut-out recognition means 3 for cutting out a segment corresponding to each character from the image data and performing individual character recognition on each cut-out segment, a recognition result buffer 4 for storing a result of the cut-out recognition means 3, word searching means 5 for searching a word string candidate corresponding to a combination of character candidates in the recognition result buffer 4, a word string candidate buffer 6 for storing a search result of the word search means 5, check portion determining means 7 for determining a check target portion and a presumed character string of the check target portion on the basis of the result of the word string candidate buffer 6, and a check means 8 for judging the possibility of existence of the presumed character string of the check target portion determined by the check portion determining means 8.

Each of the image buffer 2, the recognition result buffer 4 and the word string candidate buffer 6 may be constructed by a storage device such as an IC memory, a magnetic disc device or the like. The image input means 1 may be constructed by an image scanner. The cut-out recognition means 3, the word searching means 5, the check portion etermining means 7 and the check means 8 may be constructed by a CPU of a computer or exclusively-used circuits.

Figure 1A:
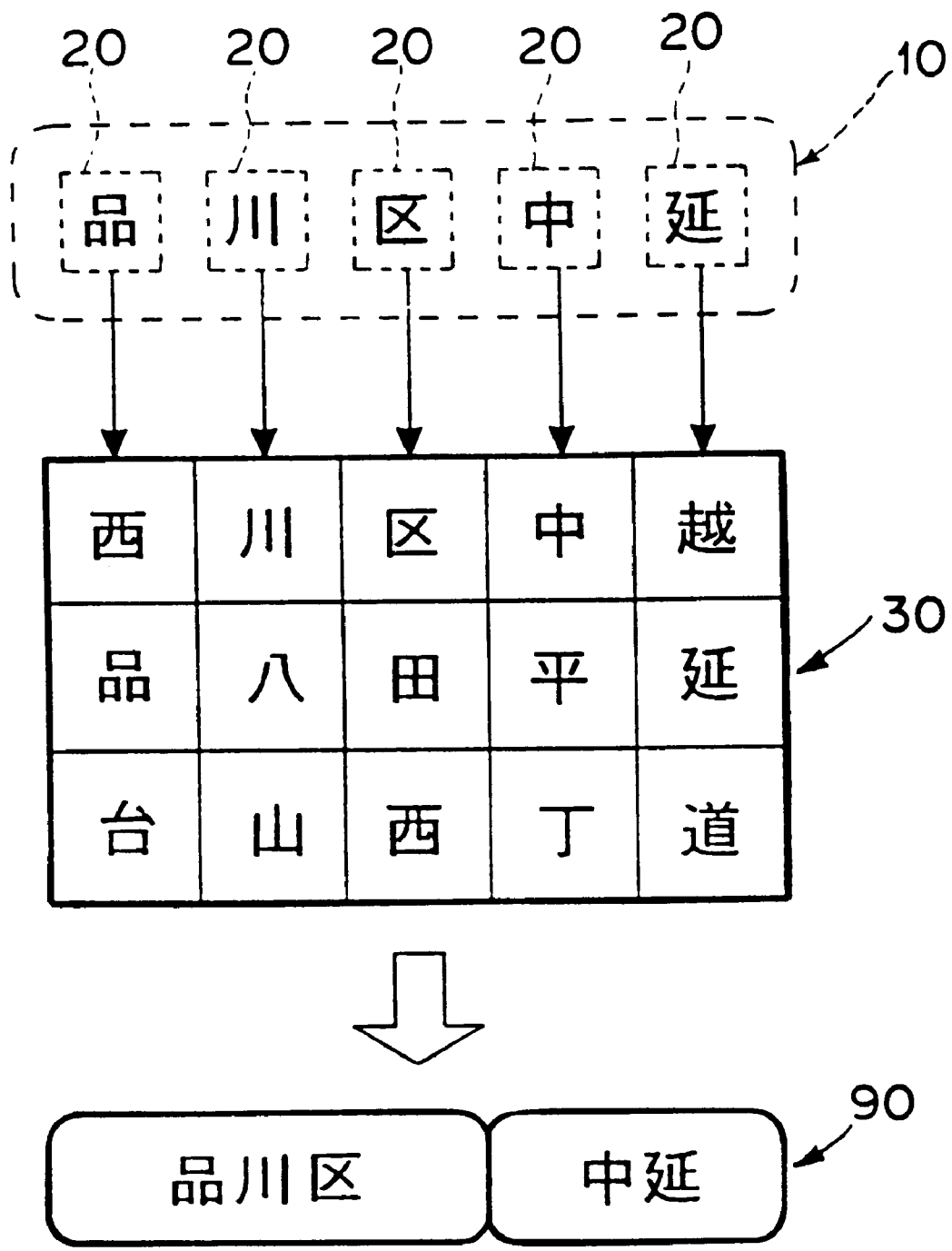
FIG. 1A is a diagram showing a process flow of a conventional address reading operation.

In FIG. 3, the conventional character strings reading device as described above corresponds to an assembly of all the elements but the check portion determining means 7 and the check means 8, that is, the conventional device comprises an assembly of the image input means 1, the image buffer 2, the cut-out recognition means 3, the recognition result buffer 4, the word searching means 5 and the word string candidate buffer 6, and the process flow thereof is identical to that of the conventional technique as described above with reference to FIG. 1A. A method of realizing the above processing is described in the documents 1 to 13 as described above.

The check portion determining means 7 and the check means 8 which are the main features of the present invention will be described on the basis of the following embodiment.

The following two methods are used in the check portion determining means 7 to determine a check target portion.

(A) With respect to a word string candidate (a candidate of a reading result; reading result candidate), a portion having no character candidate which corresponds to a character constituting the word string candidate (that is, a read-skipped portion) is set as a check target portion. In this case, a character string at the read-skipped portion is set as a presumed character string.

(B) A plurality of word string candidates (candidates as reading results) are compared with one another, and a portion at which a partial difference is detected between these word string candidates is set as a check target portion. In this case, a character string at a portion where a partial difference is detected is set as a presumed character string.

Such a judgment is performed according to the following procedure. Here, it is assumed that the word string candidate buffer 6 to be referred to during the judgment is stored with a character string of reading result candidates, judgment on presence or absence of a character candidate corresponding to each of characters constituting the character string, and a corresponding segment position if a character candidate exists. These pieces of information necessarily occur in the processing of the word searching means 5, and in the prior art these information are output or can be easily output from the word searching means 5.

The judgment procedure of (A) is as follows:

[Step A-1]

The presence or absence of character candidate is checked on each reading result candidate. If "absence" of character candidate is judged, the following processing of [step A-2] is executed on such sequential reading result candidates collectively.

[Step A-2]

A segment position corresponding to a portion where "absence" of character candidate is judged (hereinafter referred to as "absence" portion) is found out, and it is set as a check target portion. Furthermore, a character string of the character candidate "absence" is set as a presumed character string.

The judgment procedure of (B) is as follows.

[Step B-1]

A plurality of character strings as reading result candidates are compared with one another to detect a portion where the character strings are different from each other (hereinafter referred to as "difference portion"). The processing of [Step B-2] is executed on each difference portion.

[Step B-2]

A segment position corresponding to a difference portion is found out, and it is set as a check target portion. Furthermore, a different character string is set as a presumed character string.

In such a simple judgement as (B) as described above, the judgment becomes "positive" at an extremely high frequency (i.e., the detection frequency is extremely high) when plural reading result candidates are selected. Therefore, some restriction may be imposed on the number of characters of a difference portion (for example, the difference portion is limited to a portion where the difference occurs within two characters).

Figure 2A:
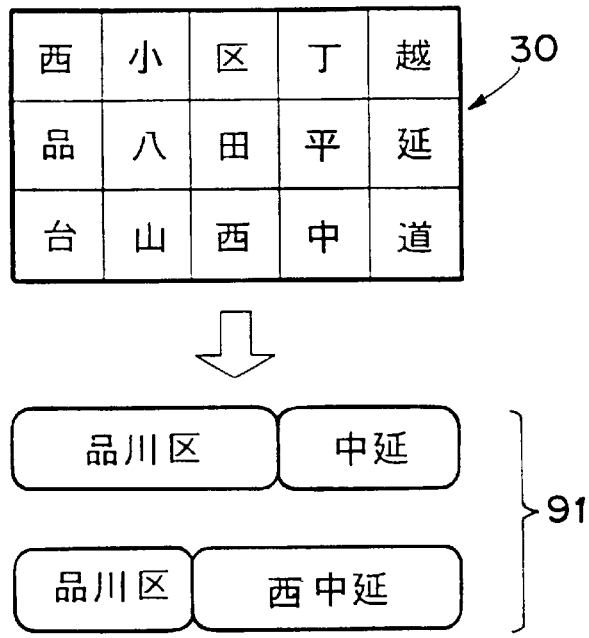
FIGS. 2A and 2B are diagrams showing character candidate strings and candidates as an address reading result.

In the case of FIG. 2A, the content of the word string candidate buffer 6 is as follows.

Reading Result Candidate 1:
    <shina> [character candidate "presence", segment (1,1)]
    <kawa> [character candidate "absence", -]
    <ku> [character candidate "presence", segment (3,1)]
    <naka> [character candidate "presence", segment (4,1)]
    <nobu> [character candidate "presence", segment (5,1)]

Reading Result Candidate 2:
    <shina> [character candidate "presence", segment (1,1)]
    <kawa> [character candidate "absence", -]
    <ku> [character candidate "absence", -]
    <nish> [character candidate "presence", segment (3,1)]
    <naka> [character candidate "presence", segment (4,1)]
    <nobu> [character candidate "presence", segment (5,1)]

If the judgment of (A) is executed on these candidates, the following detection target portion and the presumed character string are determined:

for the reading result candidate 1,
check target portion: segment (2,1)
presumed character string: <kawa>
for the reading result candidate 2
check target portion: segment (2,1)
presumed character string: <kawa><ku>

In the above representation (n,m) of the segment position, n represents the head position of a segment, and m represents the width of the segment.

Figure 2B:
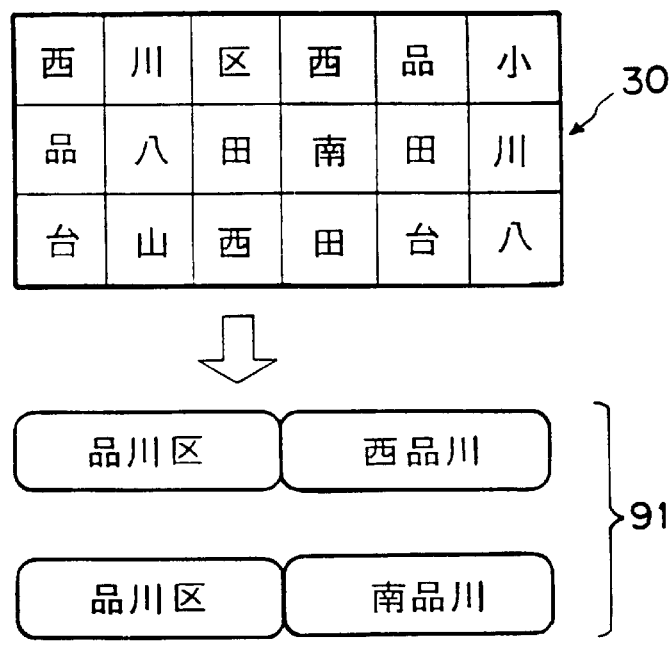

Furthermore, in the case of FIG. 2B, the content of the word string candidate buffer 6 is as follows.

Reading Result Candidate 1:
    <shina> [character candidate "presence", segment (1,1)]
    <kawa> [character candidate "presence", segment (2,1)]
    <ku> [character candidate "presence", segment (3,1)]
    <nishi> [character candidate "presence", segment (4,1)]
    <shina> [character candidate "presence", segment (5,1)]
    <kawa> [character candidate "presence", segment (6,1)]

Reading Result Candidate 2:
    <shina> [character candidate "presence", segment (1,1)]
    <kawa> [character candidate "presence", segment (2,1)]
    <ku> [character candidate "presence", segment (3,1)]
    <minami> [character candidate "presence", segment (4,1)]
    <shina> [character candidate "presence", segment (5,1)]
    <kawa> [character candidate "presence", segment (6,1)]

If the judgment procedure of (B) is executed on these candidates, the following check target portion and the presumed character string are determined:

for the reading result candidates 1 and 2,
check target portion: segment (4,1)
presumed character string: <nish> and <minami>

Next, a realizing method of the check means 8 will be described. Various methods may be considered as the realizing method of the check means 8 in accordance with the determination method of the check target portion ((A) and (B) as described above).

A first realizing method of the check means 8 is based on the assumption that the check target portion is realized by the judgement like (A) as described above. In this method, the area size of a check target portion is compared with the number of characters of a presumed character string, and if the comparison result does not satisfy a predetermined condition, the possibility of existence of a presumed character string is dismissed. Here, the "predetermined condition" is, for example, such a condition that the area size of the check target portion divided by a standard character size is compared with the number of characters of a presumed character string of the check target portion, and the comparison result (ratio) is in a range of 0.5 to 2.0. The standard character size may be preset to a fixed one, or it may be set by calculating the average of character sizes of characters before and after the check target portion, or the average of the size of readable characters. The condition of the above numerical range on the comparison result is an example, and thus it is not limited to the above numerical range. For example, such a condition that it is judged in consideration of the number of characters of a presumed character string whether the size of the check target portion is a proper size, may be set.

Figure 4:
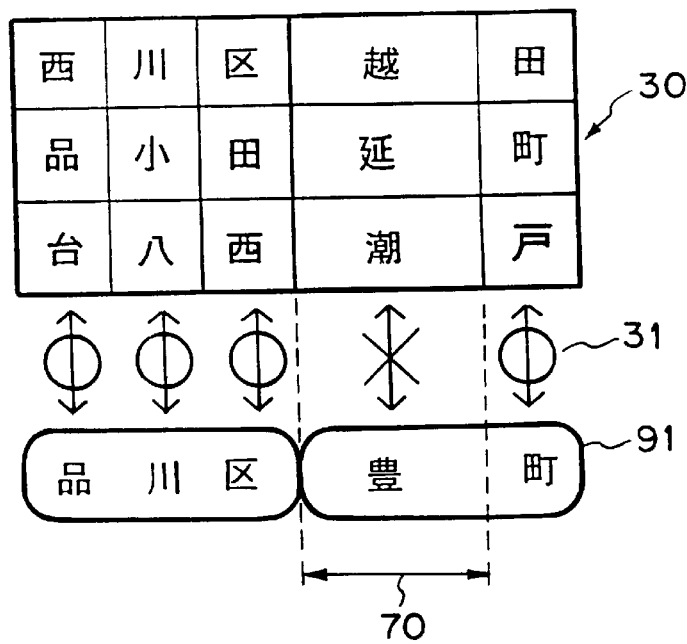
FIG. 4 is a diagram showing an operation of a first realizing method of check means.

FIG. 4 shows a case where the reading result candidate 91 is dismissed by the first realizing method of the check means 8. With respect to <shina><kawa><ku><to><go><tan><ta>, a portion of <to><go><tan> cannot be accurately separately because characters of this portion are closely contacted with one another, and thus the characters of this portion are set as one segment.

For the address reading result candidate 91 of <shina><kawa><ku><yutaka><machi>, no proper character candidate is not provided in a segment corresponding to <yutaka>, and it is set as a check target portion 70. At this time, the check target portion 70 has the area size corresponding to about three characters while its presumed character string <yutaka> is one character. Accordingly, the ratio thereof is equal to 3/1=3, and thus it does not satisfy the condition as described above. Therefore, the address reading result candidate 91 of <shina><kawa><ku><yutaka><machi> is dismissed.

A second realizing method of the check means 8 is based on the assumption of the case where the check target portion is established by the judgment of (A) like the first realizing method. The number of strokes of character candidates in the recognition result buffer 4 which are selected at the check target portion is compared with the number of strokes of a presumed character string, and the possibility of existence of the presumed character string would be dismissed if the comparison result does not satisfy a predetermined condition. Here, the "predetermined condition" means that the difference between the average number of strokes of the character candidates for the segment corresponding to the check target portion and the number of strokes of the presumed character is 5 or less.

Furthermore, there may be provided a method of excluding a segment or presumed character string from an check target if the number of characters of the segment or presumed character string is not equal to 1, or there may be provided a method of comparing an average value or a sum value. The difference of the number of strokes is not limited to 5. For example, the case is divided into two cases where one to be compared is equal to 10 or more and where each to be compared is equal to 10 or less, and a permissible difference value may be altered in accordance with these cases. Furthermore, the condition is not set in accordance with the average number of strokes of the character candidates corresponding to the check target portion, but it may be set in accordance with the maximum number of strokes or the minimum number of strokes, or the condition may be set in accordance with the number of strokes of a first candidate character.

Figure 5:
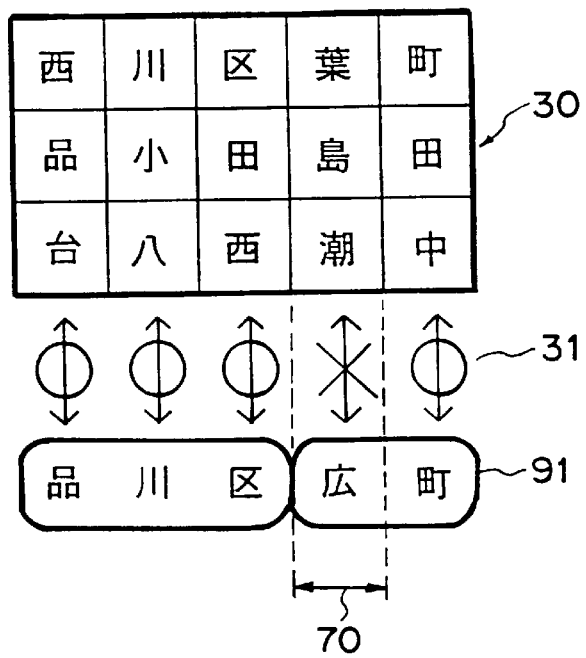
FIG. 5 is a diagram showing an operation of a second realizing method of the check means.

FIG. 5 shows a case where the reading result candidate 91 is dismissed by the second realizing method of the check means 8. With respect to (<shina><kawa><ku><yutaka><machi>), a correct character is not selected as a candidate for <yutaka>, and an address reading result candidate of (<shina><kawa><ku><hiro><machi>) is selected. No proper character candidate is provided at the segment corresponding to <hiro>, and it is set as a check target portion 70. At this time, <ha><shima><shio> are selected as character candidates for the segment corresponding to the check target portion 70. The number of strokes is equal to 12 strokes, 10 strokes, 15 strokes for the character candidates respectively, and the average number of strokes is equal to 12 strokes. On the other hand, the number of strokes of the presumed character <hiro> is equal to 5 strokes. Accordingly, the difference between the average number of strokes of the character candidates and the number of strokes of the presumed character is equal to 7 strokes. The difference is larger than the predetermined number (5), and thus the candidate 91 of the address reading result <shina><kawa><ku><hiro><machi> is dismissed.

The foregoing description is made on the embodiment using only the number of strokes. In addition, "complexity index" as proposed in "SIG Reports of the Institute of Electronics, Information and Communication Engineers, PRL73-14 may be used as an index representing complexity of a character stroke in combination. In the case of FIG. 5, complexity of the character candidates of the segment corresponding to the check target portion 70 is also calculated simultaneously with the check of the difference of the number of strokes to judge whether the average value thereof is near to the complexity of the presumed character. The final judgment is made in combination of the above complexity judgment and the comparison result of the number of strokes.

The complexity is calculated in both longitudinal and lateral directions of characters. Therefore, even when the difference in the number of strokes between the presumed character and the character candidates is judged not to appear significantly, a more detailed judgement can be made on the basis of the complexity of the stroke in the longitudinal direction and the complexity of the stroke in the lateral direction. For example, it is considered that the presumed character is <kawa> and the character candidate of the segment is <san>. The number of strokes of each of the presumed character <kawa> and the character candidate of the segment <san> is equal to 3, and thus there is no difference in the number of strokes. However, the complexity index of <kawa> is about 4 in the lateral direction and about 1 in the longitudinal direction. The complexity index of <kawa> is about 1 in the lateral direction and about 4 in the longitudinal direction. That is, these character candidates have completely opposite tendency. Accordingly, by using this result, the presumed character is judged to be improper on the basis of this result, and address reading result candidates containing the presumed character <kawa> of all reading result candidates are dismissed. In this embodiment, the calculation of the complexity of the character candidate of the segment is made on the first candidate character, however, it may be considered to use the average of the complexity indexes which also cover subordinate candidate characters.

Like the first and second realizing methods, a third realizing method of the check means 8 is based on the assumption that a check target portion is realized through the judgment of the type (A). When the number of segments in the recognition result buffer 4 corresponding to a check target portion is coincident with the number of characters of a presumed character string, the individual character recognition of the segments corresponding to the presumed character string is re-tried by using an individual character recognition means which is different from the cut-out recognition means 3. If a character candidate obtained by the retrial is coincident with the presumed character string, existence of the presumed character string is admitted. If the number of the segments at the check target portion is coincident with the number of characters of the presumed character array, a segment dividing manner is assumed to be correct, and only the character recognition for each segment at the check target portion is re-tried. In this case, only a standard character pattern set for comparison may be replaced and a partial processing of the cut-out recognition means 3 may be utilized. In order to make a difference between the case where the cut-out recognition means 3 is used and the case where the individual character recognition means is used, may be used a different recognition dictionary in which a standard character pattern set containing an inclination feature of characters such as an upward and rightward inclination, etc. or a standard character pattern set in which character tendency such as a font is varied is registered.

In the candidate 91 of the address reading result of <shina><kawa><ku><naka><nobu> of FIG. 2A, no proper character candidate exists at the segment corresponding to <kawa>, and thus it is set as a check target portion. If <kawa> of the presumed character string is newly selected by using the third realizing method of the check means 8, all the characters of (<shina><kawa><ku><naka><nobu>) can be regarded as being read.

Like the first, second and third realizing methods, a fourth realizing method of the check means 8 is based on the assumption that the check target portion is realized by the judgment of the (A) type. If the number of segments in the recognition result buffer 4, which are provided at the check target portion, is not coincident with the number of characters of the presumed character string, the cut-out operation of the segments is re-tried from image data at an area corresponding to the check target portion by considering the shape of the presumed character string or the number of characters thereof, and the individual recognition is performed on each segment. If the character candidate of the character recognition result is coincident with the presumed character string, the existence of the presumed character string is admitted. In this case, the same processing as the cut-out recognition means 3 is carried out on the check target portion again. At this time, since the character number of the presumed character string is known, the cut-out operation is carried out so that the number of segments is coincident with the number of the presumed character string because the number of characters of the presumed character string is known. In order to match the number of segments with an indicated number, candidate positions of divisional points of segments may be selected in the order of a higher possibility to the indicated number.

It may be considered that not only the number of the characters of the presumed character string is merely matched with the number of the divisional segments, but also the divisional points are set in consideration of the shape of the presumed character string. For example, with respect to a longitudinally-written one segment, a case where <to><kyo> as a presumed character string is divided will be described with reference to FIG. 13.

It is proper to set as the divisional position a position where longitudinal rods are located at the center (it is improper to divide the characters at a gap position which is likely to be below "nabebuta" or upper portion of <kyo> and sandwiched between lateral rods). As a general method, if a shadow of a pattern (an accumulation value of a histogram of black picture elements) is picked up in a character string direction every picture element in an image at a check target portion and the character string is divided at a portion where no shadow component exists, the position below the "nabebuta" is set as the divisional point, and thus the cut-out operation cannot be correctly performed. However, when the contact of <to><kyo> is presumed, there are many cases where the stroke which is located at the center of <to> and extends in the longitudinal direction comes into contact with the "nabebuta" of <kyo>. Therefore, if the pattern of the contact is stored, the divisional point can be accurately determined on the basis of this stored contact pattern. This judgment using the contact pattern is not limited to (<to><kyo>). There are many cases where the final stroke of a first character abut against a second character, and thus individual contact patterns may be stored case by case when characters are contacted with each other.

Figure 14:
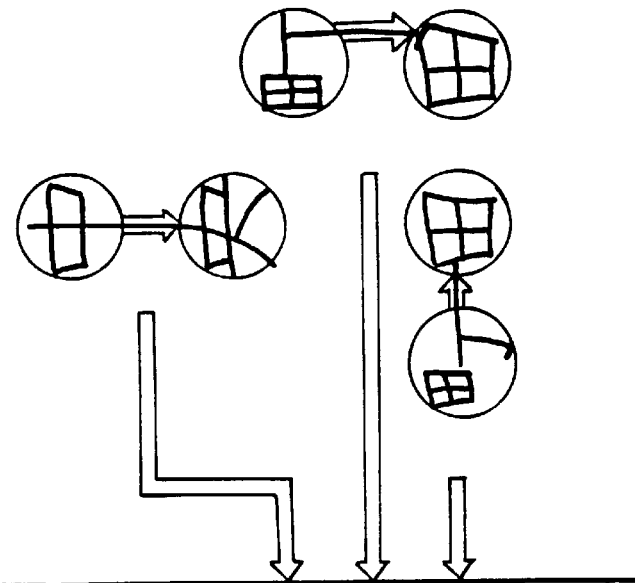
FIG. 14 shows an example of a dictionary in which a contact mode to search divisional points is registered.
Figure 15:
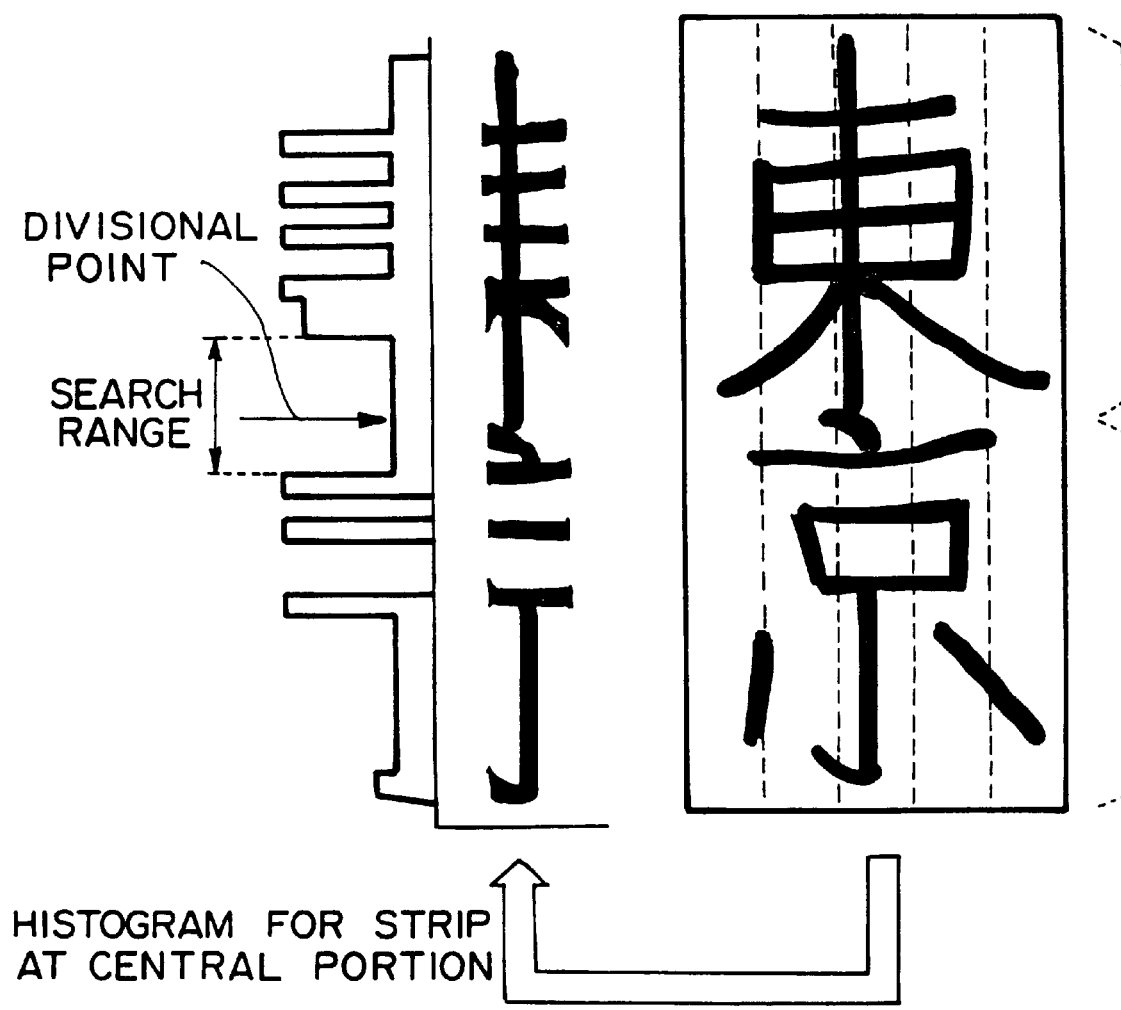
FIG. 15 shows an example of detection of the divisional points.

As a storing method of contact patterns, such a portion that the character contact occurs as shown in FIG. 14 is beforehand registered as a feature of the divisional point. With this registration, discrimination between the longitudinal writing and the lateral writing can be performed, and divisional points which are matched with the kind of a presumed character string can be obtained.

In order to accurately detect a position above the "nabebuta" of <kyo> as the divisional point from the pattern corresponding to a check target portion which is presumed as <to><kyo>, a portion where the divisional point is located is checked on the basis of a dictionary of divisional points of strokes as shown in FIG. 14. In this case, the divisional point is regarded as being located at the center portion. Subsequently, when the divisional point is detected from the central portion, a check target area is divided in a stripe shape in the direction of the character string, and shadow components are picked up for a slender rectangular area (one of striped areas) at the center portion again, and a portion where the shadow component rapidly increases is judged as the portion corresponding to the stroke of the lateral direction of "nabebuta" of <kyo>. Therefore, the divisional point is set at a position which is slightly above the "nabebuta" portion (so as to contain a "tab" of the "nabebuta" of <kyo>).

The above embodiment uses a dictionary in which places at which the character contact occurs are registered every candidate character string, however, only a first character of the candidate character string may be registered on a list.

A fifth realizing method of the check means 8 is based on the assumption that the check target portion is realized by the judgment of the (B) type as described above. By using individual character recognition means which is different from the cut-out recognition means 3, the individual character recognition of segments corresponding to a presumed character string is re-tried, and the existence of the presumed character string is admitted if reliability of a character candidate obtained as a retrial result satisfies a predetermined criterion. The satisfaction of the predetermined criterion means a case where it exceeds a threshold value of reliability which is set as a fixed value, a case where there is a large difference in reliability from a subordinate character candidate, or the like.

In order to make a difference between the case of using the cut-out recognition means 3 and the case of using the individual character recognition means, for example, it may be adopted to use a different recognition dictionary in which a standard character pattern set added with a character tendency such as an upward and rightward inclination or a standard character pattern set in which a tendency such as a font is varied is registered, like the third realizing method of the check means 8. Furthermore, when the check target portion is based on the judgment of the (B) type as described above, there occurs many cases where those kinds of characters which are relatively similar to each other, such as <minami> and <nish>, <to> and <hon>, etc. are selected as being partially different characters. Therefore, an individual recognition means of performing only the discrimination of these characters with high precision may be provided. For example, only those kinds of characters which become similar character pairs are targeted to form a recognition dictionary in which variations of deformation of thereof are registered as much as possible, and comparison with the recognition dictionary is performed with a relatively severe criterion. Furthermore, a character identification may be performed while varying the size or inclination of the pattern of a check target portion.

In the character string reading device shown in FIG. 3, it may be controlled that all the character candidates are not used by the word searching means 5 at an initial stage. That is, at the initial stage, only super-ordinate candidates of all the character candidates are used to execute the word searching means 5, and when the check means 8 is executed, subordinate candidates of the character candidates are also used.

In such a case, in the check portion determining means 7, the following policy (C) which is different from the policies (A) and (B) is adopted to determine the check target portion.

(C) With respect to the word string candidate (candidate of reading result), a portion where a candidate character corresponding to a character constituting the word string candidate is not contained in super-ordinate, is set as a check target portion. In this case, the character string of the portion is set as a presumed character string.

In the case of FIG. 2A, for the candidate 91 of the address reading result of <shina><kawa><ku><naka><nobu>, the portion of <kawa> is set as a check target portion according to the judgment of (A). Here, assuming that a super-ordinate candidate is a second or higher candidate, the portion of <naka> which is a third candidate character is also set as a check target portion.

At this time, as a sixth realizing method of the check means 8, if one of subordinate character candidates in the recognition result buffer 4 which corresponds to the check target portion is coincident with a presumed character string, the existence of the presumed character string is admitted. For <naka> in FIG. 2A, the above check succeeds.

Furthermore, the word searching means 5 as described in the documents 1 to 13 is performed by a method of generating s a combination of character candidates in the recognition result buffer 4 to search whether it exists in the word dictionary, or a method of searching whether a word picked up from the word dictionary is found out as a combination of character candidates in the character candidate string in the recognition result buffer 4. A method shown in FIG. 6 may be used as a realizing method which is different from the above methods.

Figure 6:
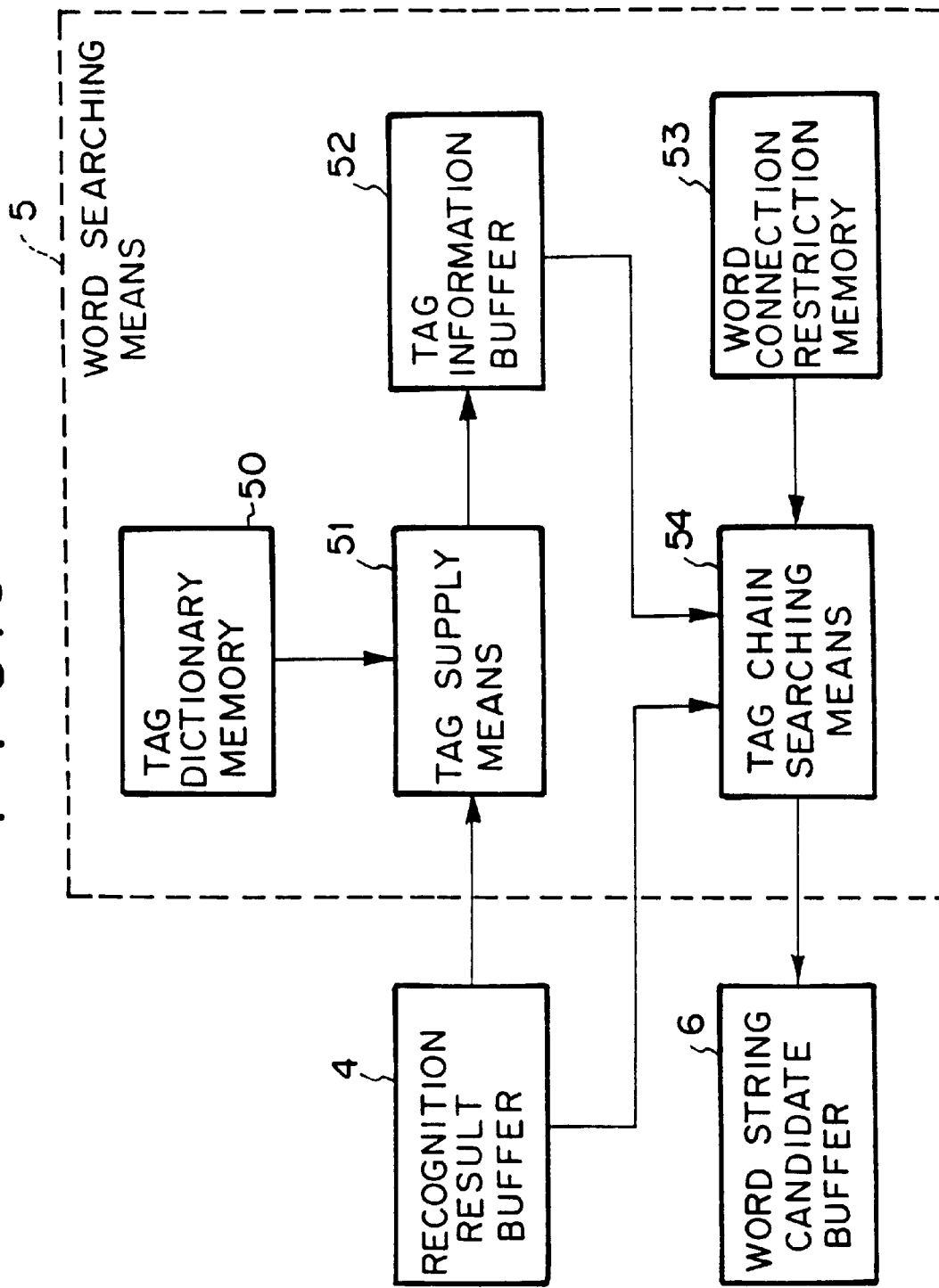
FIG. 6 is a block diagram showing a first realizing method of word searching means 5.

The word searching means 5 shown in FIG. 6 comprises the following elements.

A tag dictionary memory 50 serves to store, for each character, information on at least three items "word U containing the character, character string length L of U, position P of the character in U". For a character candidate in the recognition result buffer 4, a tag supply means 51 searches the three-item information corresponding to the character candidate from the tag dictionary memory 50. A tag information buffer 52 stores the result of the tag supply means 51. A word connection restriction memory 53 describes a connection restriction between words. A tag chain searching means 54 links two three-item information [U1,L1,P1] and [U2,L2,P2] in the tag information buffer 52 by using the positional relationship of the segments corresponding to the three-item information and the relationship between U1,L1,P1,U2,L2,P2to thereby output the word string candidate corresponding to a combination of character candidates in the recognition result buffer 4 to the word string candidate buffer 6. The tag dictionary memory 50, the tag information buffer 52 and the word connection restriction memory 53 are realized by a storage device such as an IC memory, a magnetic disc device or the like. The tag supply means 51 and the tag chain searching means 54 are realized by a CPU of a computer or an exclusively used circuit.

Figure 10:
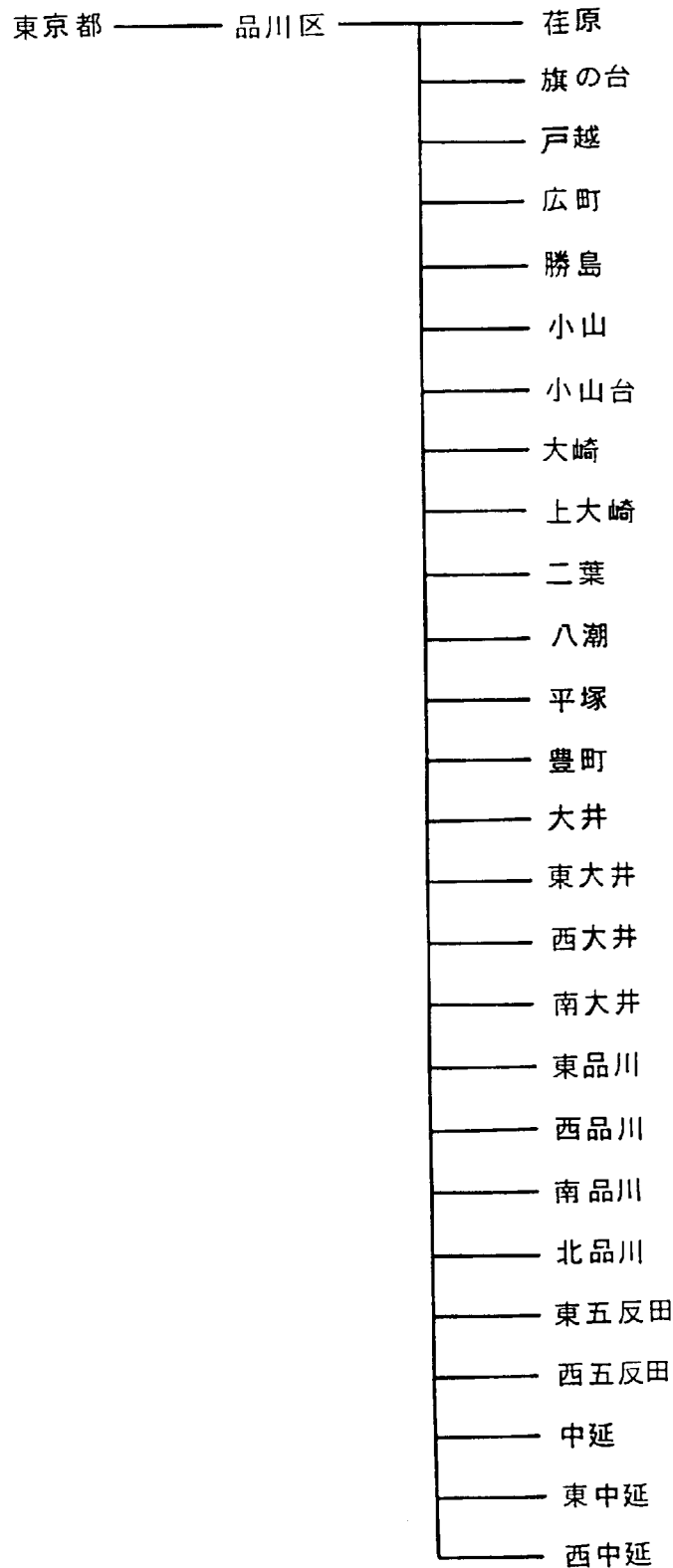
FIG. 10 is a list of address elements.

When addresses written on mails or a register are read, a super-ordinate-subordinate relationship of addresses which is represented by a hierarchical structure as shown in FIG. 10 is stored in the word connection restriction memory 50. That is, for an address structure of <shina><kawa><ku> of FIG. 10, <shina><kawa><ku> is subordinate to <to><kyo><miyako>, and other city names (<e><hara>), (<hata><no><dai>), etc. are further subordinate to <shina><kawa><ku>. In the case of address, the basic super-ordinate-subordinate relationship is established in the order of the names of "To, Do, Fu and Prefectures", the names of cities, wards, and districts, and the names of towns, etc. There are some cases where the name of a town is further divided at a multi-level like the name of oaza, the name of koaza (or the name of a town, the series town names). In the case of addresses, the super-ordinate-subordinate relationship of address elements directly serves as a restriction on arrangement of the address elements. That is, the addresses are arranged from a superordinate address element to a subordinate address element.

In a case of FIG. 10, the arrangement of (<to><kyo><miyako>)—(<shina><kawa><ku>)—(<naka><nobu>) is allowed, however, such arrangement of (<to><kyo><miyako>)—(<naka><nobu>) or (<naka><nobu>)—(<hata><no><dai>) is not allowed. As a representation method of the connection restriction as described above, there are a method of describing allowing or disallowing the connection to all combinations of two address elements, and a method of listing address elements which can be connected immediately after or before an address element. When a character string of a general document is read, the allowance or disallowance of the connection of words is described, not on the basis of the hierarchical structure for addresses, but on the basis of a grammatical word arrangement.

Figure 11:
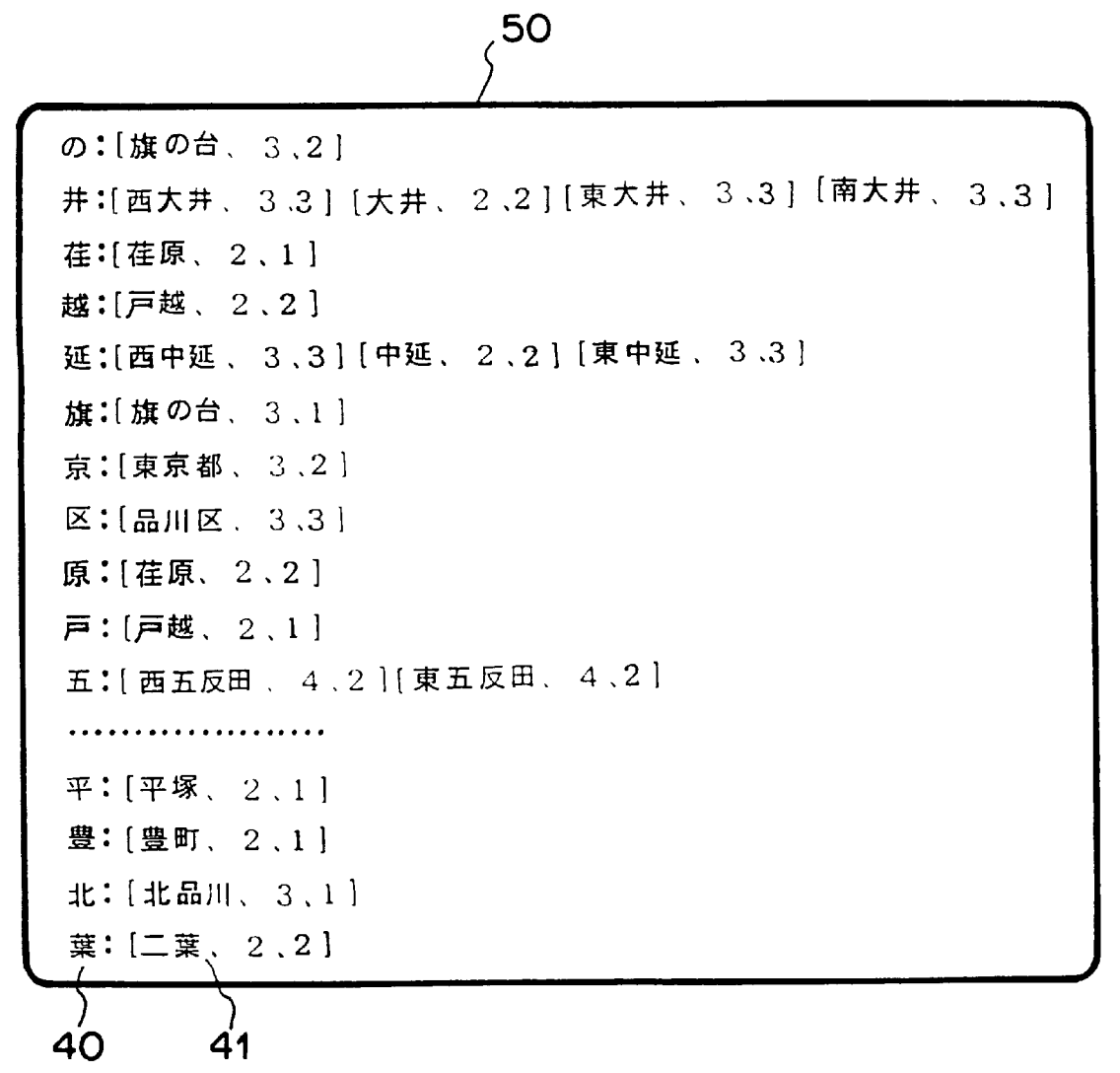

The tag dictionary memory 50 stores three-item information of "character string U of words, character string length L of U, position P of a character in U" for each character constituting words appearing in a reading target. FIG. 11 shows an example of the content of the tag dictionary memory 50 for such an address element group as shown in FIG. 10. In FIG. 11, a key character 40 at the left side of [:] represents each character appearing in each address element, and at the right side thereof corresponding three-item information is arranged. The three-item information represents that the character <e> is a first character of two characters of an address element (<e><hara>) when it is [<e><hara>,2,1] corresponding to <e>. Since there are some cases where a character appears in plural address elements, for example, when <nobu> appears in [<nish><naka><nobu>,3,3], [<naka><nobu>,2,2], [<to><naka><nobu>,3,3,], the character of <nobu> is a third character of three characters of an address element [<nish><naka><nobu>], or a second character of two characters of an address element [<naka><nobu>], or a third character of three characters of an address element [<to><naka><nobu>]. The address element (word) U in the three-item information is represented with a character string in FIG. 11, however, it may be represented with a character string, but with a code value which corresponds to the address element (word).

Figure 12:
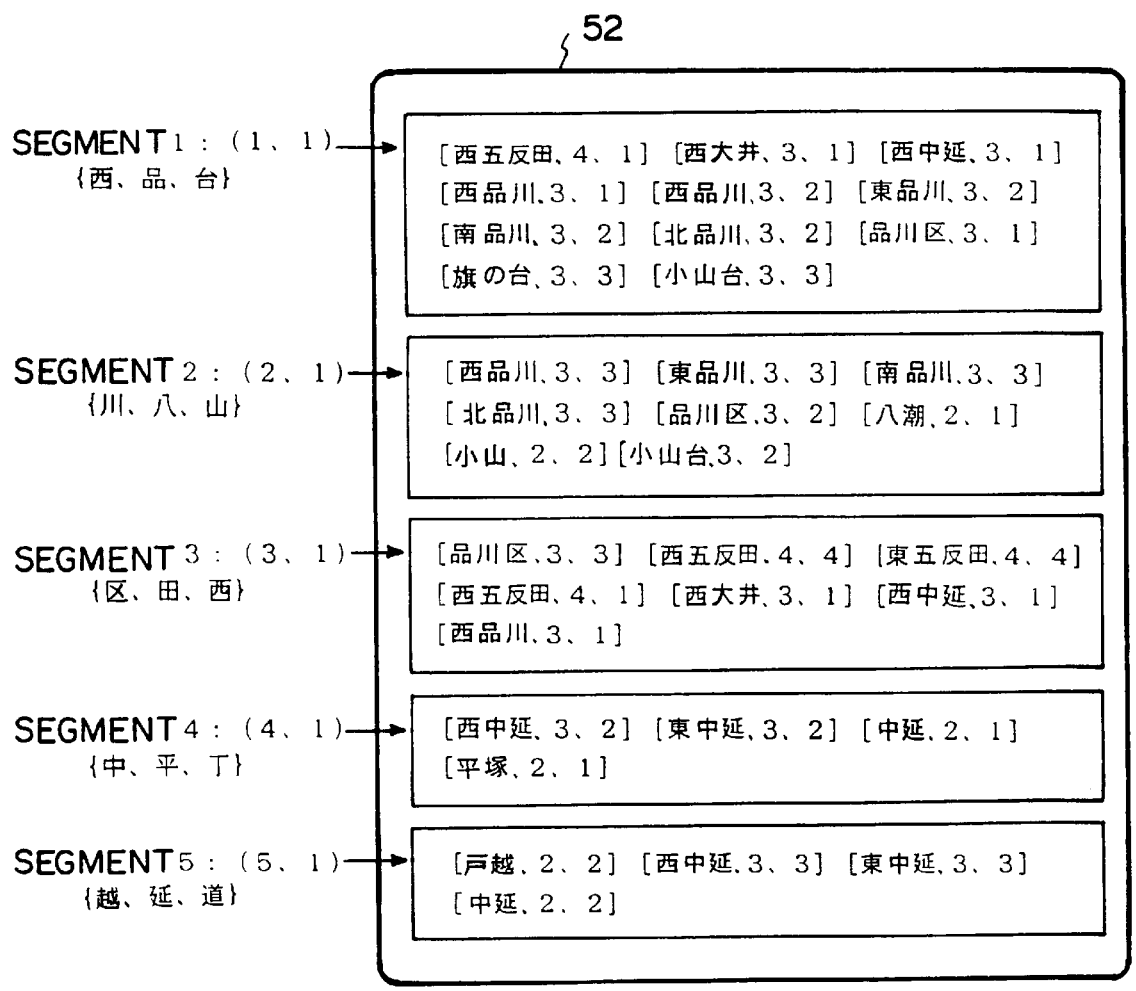
FIG. 12 shows an example of the content of a tag information buffer.

The tag supply means 51 searches the tag dictionary memory 50 for each segment stored in the recognition result buffer 4 by using each of character candidates corresponding the segment as a key. If a proper character exists in the key character 40 of the tag dictionary memory 50, the three-item information corresponding to the character is read out and then written into the tag information buffer 52. FIG. 12 shows an example of a written result in the tag information buffer 52 when the tag dictionary memory 50 shown in FIG. 11 is searched for the character candidate string 30 shown in FIG. 1A.

The following methods may be used to link two pieces of three-item information in the tag information buffer 52 to each other and determine a candidate of a reading result in the tag chain search means 54.

According to a first realizing method of the tag chain search means 54, the following conditions are set for two pieces of three-item information [U1,L1,P1] and [U2,L2,P2] in the tag information buffer 6:

condition 2*a*: the segment corresponding to [U1,L1,P1] is located before the segment corresponding to [U2,L2,P2];

condition 2*b*: U1=U2 and P1<P2; and condition 2*c*: U1 can exist before U2.

In this case, if the condition 2*a* and (the condition 2*b* or condition 2*c*) are satisfied, [U2,L2,P2] is linked subsequently to [U1,L1,P1] to form all possible combinations, and then the cost of each combination is calculated to select the best combination (or super-ordinate combination).

Figure 7:
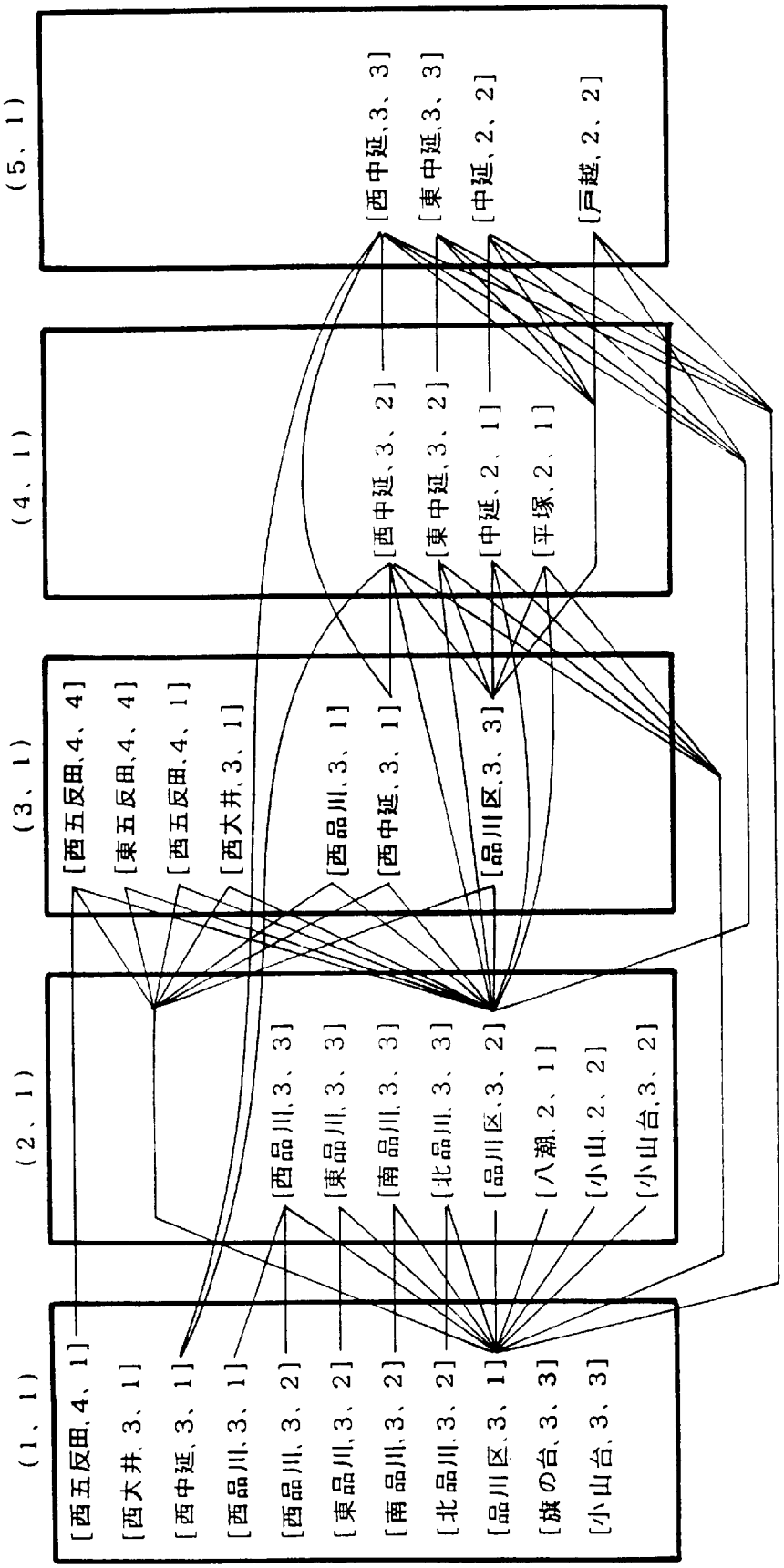
FIG. 7 is a tag linkage by a first realizing method of tag link searching means.

FIG. 7 shows a case where the tag linkage is performed on the basis of the tag information buffer 52 as shown in FIG. 12 according to the first realizing method as described above. In FIG. 7, two tags (three-item information stored in the tag information buffer 52) in which the condition 2*a* and (the condition 2b or condition 2c) are satisfied are connected to each other with a solid line. For example, the tag [<shina><kawa><ku>,3,2] of a segment (2,1) is linked to the tag [<shina><kawa><ku>,3,3] of a segment (3,1), and the condition 2a and the condition 2b are satisfied between these two tags. The satisfaction of the condition 2a is based on the fact that the end position 2 of the segment (2,1) is located in front of the head position of the segment (3,1). The satisfaction of the condition 2b is based on the fact that U1=U2= [<shina><kawa><ku>], and P1=2<P2=3. The tag [<shina><kawa><ku>,3,2] of a segment (2,1) and the tag [<hira><tsuka>,2,1] of a segment (4,1) are linked to each other because the condition 2a and the condition 2c are satisfied. Since the U1=[<shina><kawa><ku>] is a super-ordinate address element of U2=[<hira><tsuka>], it is found that the condition 2c is satisfied.

In the first realizing method of the tag chain search means as described above, all tag links which are indicated by solid lines of FIG. 7 are formed, and then the cost calculation on the combinations thereof is executed to select the best cost combination (or super-ordinate combination).

According to a second realizing method of the tag chain search means 54, the following conditions are set for two threeitem information [U1,L1,P1] and [U2,L2,P2] in the tag information buffer 52:

condition 3a: the segment corresponding to [U1,L1,P1] is adjacent to and just before the segment corresponding to [U2,L2,P2];

condition 3b: the condition 3a is not satisfied, however, the segment corresponding to [U1,L1,P1] is located in front of the segment corresponding to [U2,L2,P2];

condition 3c: U1=U2 and P1+1 =P2;

condition 3d: U1=U2 and P1+1 <P2;

condition 3e: U1 can exist just before U2, and P1=L1 and P2=1; and condition 3f: the condition 3e is not satisfied, however, U1 can exist in front of U2.

In this case, when the condition 3a and (the condition 3c or condition 3e) are satisfied, [U2,L2,P2] is linked subsequently to [U1,L1,P1] to form combinations and calculate the cost of each combination. If there is obtained no combination whose cost value is not higher than the threshold value, combinations are newly formed by further linking [U1,L1,P1] and [U2,L2,P2] in which the condition 3b and (the condition 3d or condition 3f) are satisfied, and then the cost calculation is performed again to select the best cost combination (or super-ordinate combination).

Figure 8:
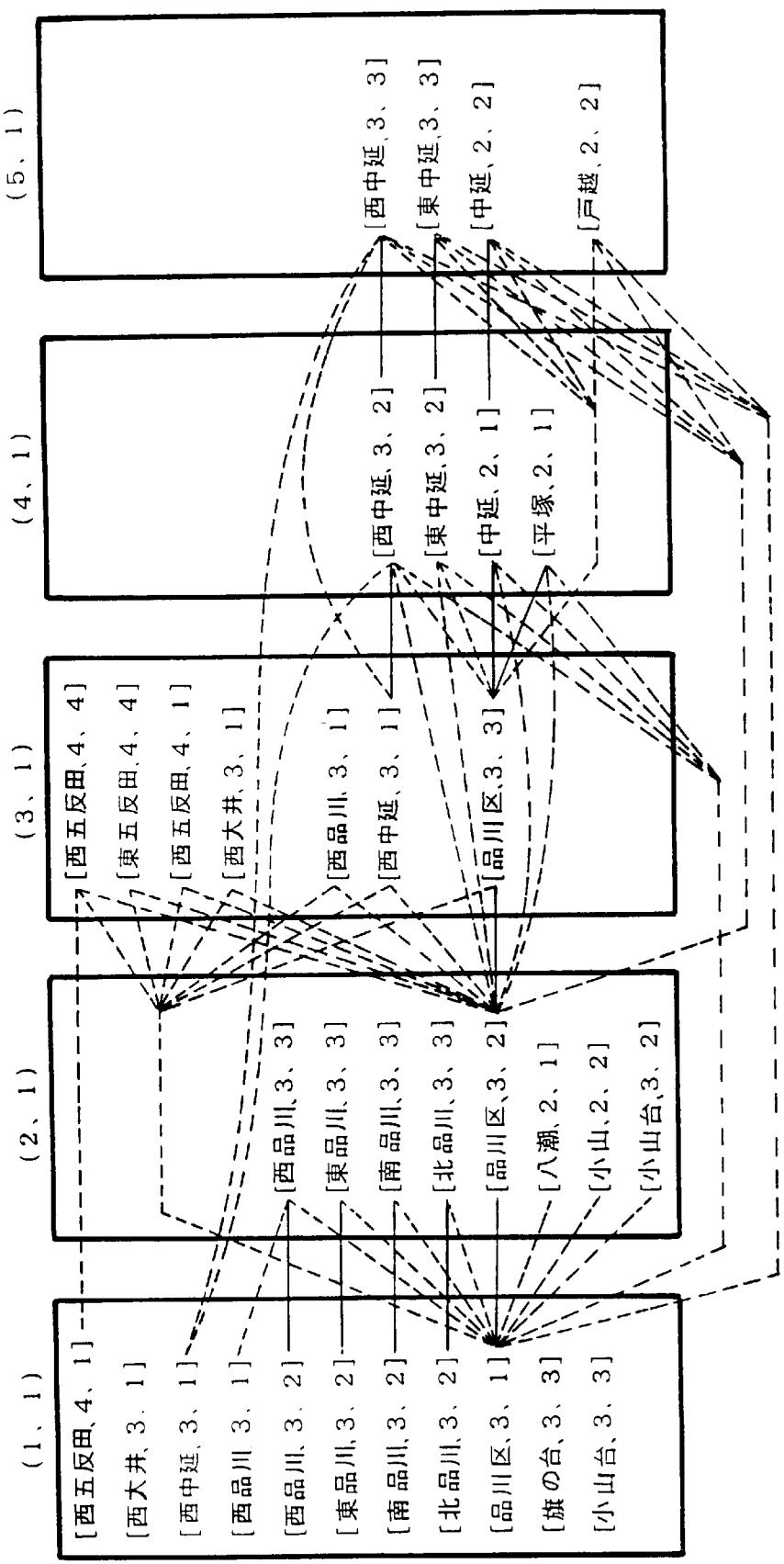
FIG. 8 is a tag linkage by a second realizing method of the tag link searching means.

FIG. 8 shows a case where the tag linkage according to the second realizing method is executed on the basis of the tag information buffer 52 as shown in FIG. 6. In FIG. 8, two tags in which the condition 3a and (the condition 3c or condition 3eare satisfied are connected to each other through a solid line. For example, the condition 3a and the condition 3c are satisfied between the tag [<nishi><naka><nobu>,3,1] of a segment (3,1) and the tag [<nishi><naka><nobu>,3,2] of a segment (4,1). The satisfaction of the condition 3a is based on the fact that the end position 3 of the segment (3,1) is located just before the head position 4 of the segment (4,1). The satisfaction of the condition 3c is based on the fact that U1=U2=[<nish><naka><nobu>], and P1+1=1+1=2=P2. Furthermore, the condition 3a and the condition 3e are satisfied between the tag [<shina><kawa><ku>,3,3] of the segment (3,1) and the tag [<naka><nobu>,2,1] of the segment (4,1). Since U1=[<shina><kawa><ku>] is a superordinate address element to U2=[<naka><nobu>] by one step, U1 can exist just before U2, and P1=L1=3, so that it is found that the condition 3e is satisfied. On the other hand, tags which satisfy the condition 3b and (the condition 3d or condition 3f) are connected to each other through a doted line. The tag links which are indicated by dotted lines in FIG. 8 correspond to the residual tag links which are obtained by removing the tag links as indicated in FIG. 8 from the tag links as indicated by the solid lines in FIG. 7.

According to a second realizing method of the tag chain searching means 54, only tag links indicated by solid lines in FIG. 8 are formed, and the cost calculation is performed on the combinations thereof. If a combination of tag links which has a cost value more excellent than the threshold value is obtained, the tag links as indicated by dotted lines in FIG. 8 are not formed. On the other hand, if no combination having a cost value which is not more excellent than the threshold value is obtained, the tag links as indicated by dotted lines are also formed, and then a combination (or super-ordinate combination) which has the best cost is selected.

According to a third realizing method of the tag chain searching means 54, in the order of a front side to a rear side in the corresponding segment position of the three-item information in the tag information buffer 52, when the following conditions are set for the three-item information [U'L'P'] whose corresponding segment position is before that of [U,L,P]:

condition 4a: U'=U and P'<P; and condition 4b: U' can exist before U.

[U',L',P'] which satisfied the condition 4a or condition 4b are successively selected so that the cost value of the combination becomes best when it is linked to [U,L,P], thereby determining the best cost combination (super-ordinate combination).

Figure 9:
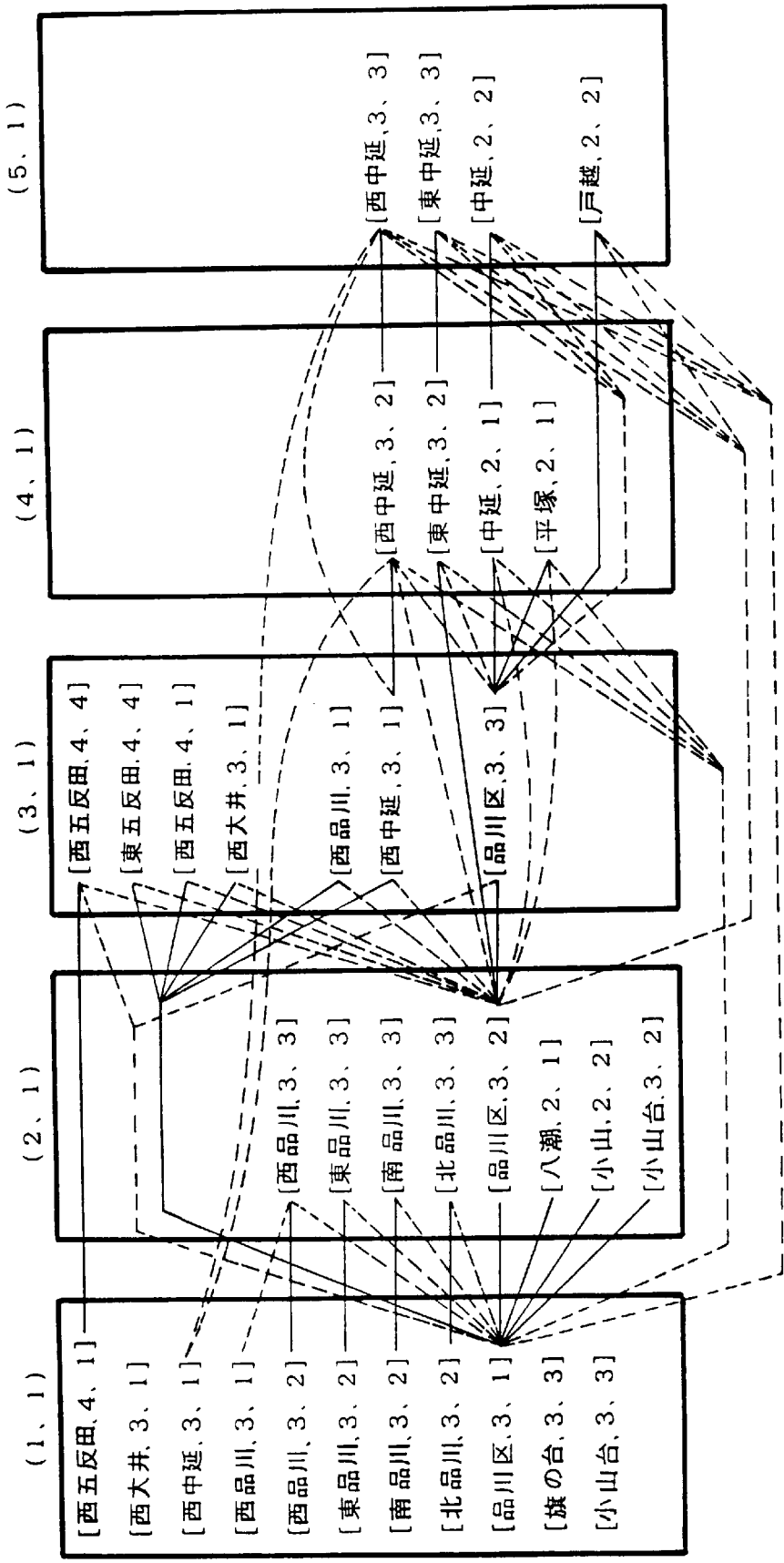
FIG. 9 is a tag link by a third realizing method of the tag link searching means.

The third realizing method of the tag chain searching means 54 will be described by using a case of FIG. 9. In the third realizing method, the processing is successively carried out from a tag whose corresponding segment position is located at a front position. In FIG. 9, the processing progresses so that the cost value of a tag [<nishi><go><tan><ta>,4,1][<nishi><oh><i>,3,1] . . . [<ko><yama><dai>] which corresponds to the segment (1,1) is first determined, and subsequently the cost value of a tag [<nishi><go><tan><ta>,4,4][<to><go><tan><ta>, 4,4] . . . [<shina><kawa><ku>],3,3] is determined. At this time, when the cost of [<naka><nobu>,2,1] corresponding to a segment (4,1) is determined, those tags which satisfy the condition 4a or 4b are searched from tags corresponding to segments (1,1) (2,1) (3,1) before the segment (4,1) to select tags which provide the best cost when these tags are linked to one another, and then the cost of [<naka><nobu>,2,1] is determined on the basis of the tag link at that time. Specifically, each of [<shina><kawa><ku>,3,1] of the segment (1,1), [<shina><kawa><ku>,3,2] of the segment (2,1) and [<shina><kawa><ku>,3,3] of the segment (3,1) satisfies the condition for [<naka><nobu>,2,1] of the segment (4,1), however, the linkage with [<shina><kawa><ku>,3,3] of the segment (3,1) is selected as a best combination which provides the best cost when each of the above three tags is linked to the tag of [<naka><nobu>,2,1] of the segment (4,1).

The tag links as indicated by dotted lines and solid lines in FIG. 9 satisfy the condition 4a or condition 4b. Those links which provide the best cost when each tag is linked to a front tag are indicated by solid lines. The method of successively determining the cost value of each tag from the front side to the rear side means that the cost is accumulated on the basis of the best combination of each tag and a tag before the tag. Therefore, it means that the best cost combination is determined by utilizing the frame of a so-called dynamic planing method (Viterbi algorithm).

In the foregoing description, the tag chain searching means 54 in the first realizing method of the word searching means 5 will be described according to the method of linking the tags and determining the word string candidate on the basis of the cost value for the combination thereof. In this case, various definition may be considered on the cost value. For example, the following matters may be reflected to the cost value.

(A) Number of linked tags (number of links of three-item information)

(B) Number of characters which are read-skipped (C) Interval of segments corresponding to tags (physical interval of tags)

(D) Difference between logical interval and physical interval of tags (E) Reliability (or distance) in individual recognition of each character In the simplest case, when only (A) is used for the cost, a predetermined fixed cost value may be added every a tag is linked. As many tags are linked to one another from the head thereof, the accumulation value of the cost value becomes good, and a combination which is constructed by links having the maximum number of tags (a combination in which the number of links of three-item information is maximum) has the best cost value.

Assuming that for the cost value =−100 points is provided to each tag, in the case of the tag chain search of FIGS. 7 to 9, the following tag combination is judged as the best combination because the cost value thereof is equal to−500 points.

[<shina><kawa><ku>,3,1]—[<shina><kawa><ku>,3, 2]—
[<shina><kawa><ku>,3, 3]—[<naka><nobu>,2,1]—[<naka>,2, 2] (1)

In the case of FIG. 7, the following combination having the same cost value=−500 points is also judged as the best combination.

[<shina><kawa><ku>,3,1]—[<shina><kawa><ku>,3, 2]—
[<shina><kawa><ku>,3, 3]—[<nish><naka><nobu>,3,2]—
[<nishi><naka><nobu>,3,3] (2)

In order to perform the judgment more precisely, the matters such as (B), (C), (D) and (E) may be used for the cost value judgment.

For two tags [U1,L1,P1] and [U2,L2,P2], the logical interval of the tags of the matter (B) is defined as follows:

For U1=U2: P2−P1−1

For U1≠U2: L1−P1+P2−1

That is, it corresponds to the number of characters which are read-skipped at some portions during a reading operation for the reading result.

For example, when the tag combination of (2) is considered in the case of FIG. 7, one character is read-skipped between [<shina><kawa><ku>,3,3] and [<nishi><naka><nobu>,3,2] (<nishi> of (<nishi><shina><kawa>) is read-skipped). Accordingly, the logical interval of the two tags is equal to 1. The logical interval of the other tags of (2) is equal to 0.

The cost of the tag link may be set so that the cost value is degraded (penalty is imposed) in accordance with the logical interval. For example, if (logical interval)×500 points is additionally introduced as a cost, the cost value of (2) is equal to −450 points, and thus it is degraded more than −500 points.

The physical interval of the tags of the matter (C) is the interval of the segments corresponding to the tags. For example, in the case of FIG. 7, the tag [<nishi><naka><nobu>,3,1] of the segment (1,1) and the tag [<nishi><naka><nobu>,3,2] of the segment (4,1) can be linked to each other. The logical interval between these two tags is equal to zero. On the other hand, the physical interval therebetween has a distance corresponding to two segments because two segments (2,1) and (3,1) exist therebetween. As a manner of counting the physical interval may be used a method of counting it on the basis of the number of segments located between two tags a method of counting it on the basis of the difference (distance) between the coordinates of two segments if the coordinates are defined, or a method of dividing the distance by an average and an average segment size.

Like the case of the logical interval, in the case of the physical interval, the cost of the tag link is set (for example, physical interval×50 points) so that the cost value is degraded in accordance with the physical interval (penalty is imposed).

The difference between the logical interval and the physical interval of the tags of the matter (D) has the following meaning. For example, the link between the tag [<shina><kawa><ku>,3, 3] and the tag [<nishi><naka><nobu>,3,2] is considered for the combination of (2) in the case of FIG. 7. The logical interval is equal to 1 while the physical interval is equal to zero. That is, this means that a character is estimated to be located at a portion where no physical interval exists, and thus this reading is unnatural. On the other hand, for the link between the tag [<nishi><naka><nobu>,3,1] of the segment (1,1) and the tag [<nishi><naka><nobu>,3,2] of the segment (4,1), the logical interval is equal to zero while the physical interval is equal to 2 (when it is counted on the basis of the number of segments). This means that a noise is contaminated between the tags, and thus it is also an unfavorable interpretation. In the foregoing description, it is indicated that when one of the logical interval and the physical interval is equal to zero, it is unnatural that the other is not equal to zero. More generally, the cost value may be set to be degraded (penalty is imposed) when the difference between the logical interval and the physical interval is large.

The matter (E) has been hitherto used for the cost calculation in a symbol reading operation, and reliability or unreliability (distance) in the individual recognition is added to the cost value judgment.

Even when the word searching means 5 is realized by the tag supply method as described above, the check operation as described above can be applied.

In the tag supply method as described above, many tags may be generated for one character. In such a case, there is a possibility that the processing time and the memory use quantity of the tag information buffer 52 may increase. Accordingly, for specific characters for which many tags are generated may be used a method of executing the check operation without generating tags. In order to achieving this method, the word searching means 5, the check portion determining means 7 and the check means 8 may be designed as follows.

The word searching means 5 comprises the following elements.

The restriction tag dictionary memory 55 serves to store, for each character excluding specific characters, at least threeitem information of "word U containing the character, character string length L of U, position P of the character in U". The tag supply means 51 searches, for a character candidate in the recognition result buffer 4, the three-item information corresponding to the character candidate from the restriction tag dictionary memory 55. The tag information buffer 53 stores the result of the tag supply means 51. The word connection restriction means 53 described a connection restriction between words. The tag chain searching means 54 links two pieces of three-item information [U1,L1,P1] and [U2,L2,P2] in the tag information buffer 52 by using the positional relationship of segments corresponding to these pieces of the three-item information and the relationship between U1,L1,P1,U2,L2,P2, to thereby output the word string candidate corresponding to a combination of character candidates in the recognition result buffer 4 to the word string candidate buffer 6.

The check portion determining means 7 determines the position of a specific character in the character string of the word string candidate in the word string candidate buffer 6 as a check target portion, and determines the specific character as a presumed character string. The check means 8 admits existence of the presumed character string when the specific character which is regarded as the presumed character string exists in the character candidates in the recognition result buffer 4 which corresponds to the check target portion.

For example, when <kawa> is set as a specific character, in the restriction tag dictionary memory 55 are not registered tags on <kawa>, such as [<shina><kawa><ku>,3,2] [<to><shina><kawa>,3,3] [<nishi><shina><kawa>,3,3] [<minami><shina><kawa>,3,3] [<kita><shina><kawa>,3,3]. As a result, for the character string candidate 30 shown in FIG. 1A <kawa> is contained in character candidates, however, no tag is provided at that portion. The check portion determining means 7 determines the position of the specific character <kawa> as a check target portion for the candidate of the address reading result of (<shina><kawa><ku><naka><nobu>). The check means 8 judges the success of the check because <kawa> is contained in character candidates (<kawa>, <ya>, <yama>) at the check target portion.

As described above, in the character string reading device of the present invention, the check target portion and the presumed character string thereof are determined for the candidate of the reading result, and the check is executed. As a result, even when all correct characters are not necessarily contained in the character cut-out and character recognition result, the accurate reading operation can be performed. Furthermore, even when a correct character competes against another character candidate, these characters are judged precisely and the accurate reading operation can be performed. Furthermore, in the check operation, all reading target are not retried, but the check target portions are screened and it is sufficient to judge the possibility of existence of a presumed character string. Therefore, the processing can be performed more efficiently than in the prior art, and the processing efficiency is high.

Still furthermore, if a tag is supplied to each of characters to link the characters without collating a combination of character candidates with a word dictionary when a word string candidate is searched from character string candidates, the processing efficiency of the character string reading operation can be further improved.

What is claimed is:

1. A character string reading device for reading character strings from input image data, comiprising:

cut-out recognition means for cutting out a segment corresponding to one character from the image data to perform individual character recognition on each segment;

a recognition result buffer for storing a recognition result of said cut-out recognition means;

word searching means for searching a word string candidate corresponding to a combination of character candidates in said recognition result buffer;

a word string candidate buffer for storing a search result of said word searching means;

check portion determining means for determining a check target portion and a presumed character string of the check target portion on the basis of the result in said word string candidate buffer; and check means for judging the possibility of existence of the presumed character string at the check portion regardless of the order of words in the character strings;

wherein said check portion determining means determines as a check target portion a portion at which a part of a character string of a word string candidate in said word string candidate buffer is not obtained in said recognition result buffer, and determines the character string of the part as a presumed character string, and wherein if the number of segments in said recognition result buffer which correspond to the check target portion is coincident with the number of characters of the presumed character string, the individual character recognition is retried on the segment corresponding to the presumed character string by using individual character recognition means which is different from said cut-out recognition means, and existence of the presumed character string is admitted if the character candidate which is obtained as a result of the retrial is coincident with the presumed character string.

2. A character string reading device for reading character strings from input image data, comprising:

cut-out recognition means for cutting out a segment corresponding to one character from the image data to perform individual character recognition on each segment;

a recognition result buffer for storing a recognition result of said cut-out recognition means;

word searching means for searching a word string candidate corresponding to a combination of character candidates in said recognition result buffer;

a word string candidate buffer for storing a search result of said word searching means;

check portion determining means for determining a check target portion and a presumed character string of the check target portion on the basis of the result in said word string candidate buffer; and check means for judging the possibility of existence of the presumed character string at the check portion regardless of the order of words in the character strings;

wherein said word searching means comprises a tag dictionary memory for storing, for each character, at least three-item information of "word U containing the character, character string length L of U, position P of the character in U", tag supply means for searching, for a character candidate in said recognition result buffer, the three-item information corresponding to the character candidate from said tag dictionary, a tag information buffer for storing a result of said tag supply means, a word connection restriction memory for describing a connection restriction between words, and a tag chain searching means for linking two pieces of three-item information (U1, L1, P1) and (U2, L2, P2) in said tag information buffer to each other by using the positional relationship of the segments corresponding to the three-item information and the relationship between U1, L1, P1, U2, L2, P2, to thereby output the word string candidate corresponding to a combination of character candidates in said recognition result buffer.

3. A character string reading device for reading character strings from input image data, comprising:

cut-out recognition means for cutting out a segment corresponding to one character from the image data to perform individual character recognition on each segment;

a recognition result buffer for storing a recognition result of said cut-out recognition means;

word searching means for searching a word string candidate corresponding to a combination of character candidates in said recognition result buffer;

a word string candidate buffer for storing a search result of said word searching means;

check portion determining means for determining a check target portion and a presumed character string of the check target portion on the basis of the result in said word string candidate buffer; and check means for judging the possibility of existence of the presumed character string at the check portion regardless of the order of words in the character strings;

wherein said word searching means comprises a restriction tag dictionary memory for storing, for each character excluding a specific character, at least three-item information of "word U containing the character, character string length L of U, position P of the character in U", tag supply means for searching, for character candidates in said recognition result buffer, the three-item information corresponding to the character candidates from said restriction tag dictionary memory, a tag information buffer for storing the result of said tag supply means, a word connection restriction memory for describing a connection restriction between words, and tag chain searching means for linking two pieces of three-item information (U1, L1, P1) and (U2, L2, P2) in said tag information buffer to each other by using the positional relationship of the segments corresponding to the three-item information and the relationship between U1, L1, P1, U2, L2, P2, to thereby output the word string candidate corresponding to a combination of character candidates in said recognition result buffer, wherein said check portion determining means determines as a check target portion the position of the specific character of the character string of the word string candidate in said word string candidate buffer, and determines the specific character as a presumed character string, and wherein said check means admits existence of the presumed character string when the specific character which is regarded as the presumed character string exists in the character candidates in said recognition result buffer corresponding to the check target portion.

4. The character string reading device for reading character strings from input image data, comprising:

cut-out recognition means for cutting out a segment corresponding to one character from the image data to perform individual character recognition on each segment;

a recognition result buffer for storing a recognition result of said cut-out recognition means;

word searching means for searching a word string candidate corresponding to a combination of character candidates in said recognition result buffer;

a word string candidate buffer for storing a search result of said word searching means;

check portion determining means for determining a check target portion and a presumed character string of the check target portion on the basis of the result in said word string candidate buffer; and check means for judging the possibility of existence of the presumed character string at the check portion regardless of the order of words in the character strings;

wherein said check portion determining means compares character strings of plural word string candidates in said word string candidate buffer to determine as a check target portion a portion at which a partial difference is detected between the character strings and to determine as a presumed character string plural combinations of character strings having different portion, and wherein said check means retries the individual character recognition of the segment corresponding to the presumed character string by using character recognition means which is different from said cut-out recognition means and admits existence of the presumed character string in which reliability of the character candidate of the retrial result satisfies a predetermined criterion.

* * * * *